US012812514B2

(12) United States Patent
Harris et al.

(10) Patent No.: US 12,812,514 B2
(45) Date of Patent: Nov. 24, 2026

(54) SLOT OR SYMBOL RECLASSIFICATION FOR DYNAMICALLY ADAPTED SPATIAL ELEMENTS

(71) Applicant: Nokia Technologies Oy, Espoo (FI)

(72) Inventors: John Harris, Whitefish Bay, WI (US); Matha Deghel, Massy (FR)

(73) Assignee: Nokia Technologies Oy, Espoo (FI)

( * ) Notice: Subject to any disclaimer, the term of this patent is extended or adjusted under 35 U.S.C. 154(b) by 371 days.

(21) Appl. No.: 18/415,130

(22) Filed: Jan. 17, 2024

(65) Prior Publication Data

US 2024/0292321 A1 Aug. 29, 2024

Related U.S. Application Data

(60) Provisional application No. 63/448,028, filed on Feb. 24, 2023.

(51) Int. Cl.

*H04W 48/16* (2009.01)
*H04L 5/00* (2006.01)
*H04W 72/044* (2023.01)
*H04W 72/0446* (2023.01)

(52) U.S. Cl.

CPC ........... *H04W 48/16* (2013.01); *H04L 5/0048* (2013.01); *H04W 72/0446* (2013.01); *H04W 72/046* (2013.01)

(58) Field of Classification Search

CPC .... H04L 5/0048; H04L 5/0094; H04W 48/16; H04W 72/0446; H04W 72/046; H04W 72/231; H04W 72/232; H04W 76/28

See application file for complete search history.

(56) References Cited

U.S. PATENT DOCUMENTS

2025/0350333 A1* 11/2025 Nimbalker ........... H04B 17/346

OTHER PUBLICATIONS

"3rd Generation Partnership Project; Technical Specification Group Radio Access Network; NR; Physical layer procedures for data (Release 17)", 3GPP TS 38.214, V17.4.0, Dec. 2022, pp. 1-231.

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

(Continued)

*Primary Examiner* — Eric Nowlin

(74) *Attorney, Agent, or Firm* — Barta Jones, PLLC

(57) ABSTRACT

A method includes receiving a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

15 Claims, 19 Drawing Sheets

(56) References Cited

OTHER PUBLICATIONS

"3rd Generation Partnership Project, Technical Specification Group Radio Access Network; NR; Multiplexing and channel coding (Release 17)", 3GPP TS 38.212, V17.4.0, Dec. 2022, pp. 1-202.
"New SI: Study on network energy savings for NR", 3GPP TSG RAN Meeting #94e, RP-213554, Agenda: 8A.1, Huawei, Dec. 6-17, 2021, 5 pages.
"3rd Generation Partnership Project; Technical Specification Group Radio Access Network; Study on network energy savings for NR (Release 18)", 3GPP TR 38.864, V18.0.0, Dec. 2022, pp. 1-71.
"New WID: Network energy savings for NR", 3GPP TSG RAN Meeting #98-e, RP-223540, Agenda: 9.1.1, Huawei, Dec. 12-16, 2022, pp. 1-6.
Patent Cooperation Treaty Application No. PCT/CN2022/122566, "Enhanced CSI Configuration for Spatial Domain Adaptation", filed on Sep. 29, 2022, pp. 1-78.
U.S. Appl. No. 63/485,369, "Multiple Antenna Spatial Partition Cycling for Network Energy Savings", filed on Feb. 16, 2023, pp. 1-25.

* cited by examiner

210

| **Slot is determined to be "Available" for Tx/Rx with limited Tx/Rx Approach.** | *Spatial element configuration:* | |
|---|---|---|
| **Availability determination:** Based on the spatial pattern (e.g. number of spatial elements), and can also be based on the UE's spatial conditions | ***slot and/or symbol configured with 16 spatial elements*** | ***slot and/or symbol configured with 64 spatial elements*** |
| UE in better spatial conditions: | **Pavail** | SAvail |
| UE in worse spatial conditions: | Not Avail | **Pavail** |

FIG. 2A

220

| **Slot is determined to be "Available" for Rx (On Duration).**<br>**Availability usage:**<br>- Available during PAvail for limited Tx/Rx (e.g. On Duration), and in SAvail use default (not use On Duration).<br>- But if insufficient PAvail slots for that limited Tx/Rx (e.g. On Duration) within a time frame then that limited Tx/Rx can use SAvail. | *Spatial element configuration:* | |
|---|---|---|
| | ***slot and/or symbol configured with 16 spatial elements*** | ***slot and/or symbol configured with 64 spatial elements*** |
| UE in better spatial conditions: | **PAvail** (OnDuration) | SAvail |
| UE in worse spatial conditions: | Not Avail | **PAvail** (OnDuration) |

FIG. 2B

230

| **Slot is determined to be "Available" for Tx/Rx (Slot Agg (slot aggregation or UL or DL repetitions), CG (configured grant PUSCH and/or PDSCH), PUCCH Rep (PUCCH repetition), SR, and RACH).**<br>**Availability usage:**<br>- Available during PAvail for limited Tx/Rx (e.g. Slot Aggregation PUSCH/PDSCH number of repetitions), CG (configured grant PUSCH and/or PDSCH), PUCCH Rep (PUCCH repetition), SR and RACH), and in SAvail use default (not using that limited Tx/Rx),<br>- But if insufficient PAvail slots for that limited Tx/Rx (e.g. repetition, CG, SR, or RACH occasion/opportunity) within a time frame then that limited Tx/Rx (see above) can use SAvail | *Spatial element configuration:* | |
|---|---|---|
| | *slot and/or symbol configured with 16 spatial elements* | *slot and/or symbol configured with 64 spatial elements* |
| UE in better spatial conditions: | **PAvail** (SAg/CG/PUCCH/SR/RACH) | SAvail (SAg/CG/PUCCH/SR/RACH) |
| UE in worse spatial conditions: | NotAvail (SAg/CG/PUCCH/SR/RACH) | **PAvail (SAg/CG/PUCCH/SR/RACH)** |

FIG. 2C

240

| **Slot is determined to be "Available" for 64 QAM (i.e., 64 MCS table / 256 MCS table) / TP (DFT-S-OFDM waveform / Transform Precoding).**<br>**Availability usage:**<br>- Available during PAvail for limited Tx/Rx (e.g. 64 QAM (i.e., 64 MCS table) / TP (Tranform Precoding)), and in SAvail use default (e.g. 256 QAM / 256 MCS table) / TP (Transform Precoding) OFF / CP-OFDM). | *Spatial element configuration:* | |
|---|---|---|
| | *slot and/or symbol configured with 16 spatial elements* | *slot and/or symbol configured with 64 spatial elements* |
| UE in better spatial conditions: | **PAvail** (64/TP ON) | SAvail (256/TP Off) |
| UE in worse spatial conditions: | Not Avail | **PAvail** (64/TP ON) |

FIG. 2D

250

| **Slot is determined to be "Available" for AL8 Rx** | *Spatial element configuration:* | |
|---|---|---|
| **Availability usage:**<br>- Available during PAvail for limited Tx/Rx (e.g. AL4 and AL8 on PDCCH), and in SAvail use default (e.g. AL1, AL2 and AL4 on PDCCH). | ***slot and/or symbol configured with 16 spatial elements*** | ***slot and/or symbol configured with 64 spatial elements*** |
| | **PAvail** ((AL4) upto AL8) | SAvail ((AL1) upto AL4) |

260

| **Slot is determined to be "Available" for RACH Tx.** | *Spatial element configuration:* | |
|---|---|---|
| **Availability usage:**<br>- Available during PAvail for limited Tx/Rx (e.g. on RACH), and in SAvail use default (not use RACH and/or SR),<br>- But if insufficient PAvail slots for that limited Tx/Rx (e.g. RACH occasion) within a time frame then that limited Tx/Rx (e.g. use RACH) can use SAvail. | ***slot and/or symbol configured with 16 spatial elements*** | ***slot and/or symbol configured with 64 spatial elements*** |
| UE in better spatial conditions: | **PAvail** (RACH Occasion) | SAvail (RACH Occasion) |
| UE in worse spatial conditions: | NotAvail (RACH Occasion) | **PAvail** (RACH Occasion) |

270

| **Slot is determined to be "Available" for SR Tx.** | *Spatial element configuration:* | |
|---|---|---|
| **Availability usage:**<br>- Available during PAvail for limited Tx/Rx (e.g. on SR), and in SAvail use default (not use RACH and/or SR),<br>- But if insufficient PAvail slots for that limited Tx/Rx (e.g. SR occasion) within a time frame then that limited Tx/Rx (e.g. use SR) can use SAvail. | ***slot and/or symbol configured with 16 spatial elements*** | ***slot and/or symbol configured with 64 spatial elements*** |
| UE in better spatial conditions: | **PAvail** (SR Occasion) | SAvail (SR Occasion) |
| UE in worse spatial conditions: | NotAvail (SR Occasion) | **PAvail** (SR Occasion) |

280

| **Slot is determined to be "Available" for an alternate TimeDomainResourceAllocationList (e.g. which may be configured to allow DCI to grant larger numbers of Slot Aggregation repetitions).** | *Spatial element configuration:* | |
|---|---|---|
| **Availability usage:**<br>- Available during PAvail for limited Tx/Rx (e.g. alternate TimeDomainResourceAllocationList), and in SAvail use default (e.g. normal TimeDomainResourceAllocationList). | ***slot and/or symbol configured with 16 spatial elements*** | ***slot and/or symbol configured with 64 spatial elements*** |
| UE in better spatial conditions (or all conditions): | **PAvail** (alternate TimeDomainResourceAllocationList) | **SAvail** (default TimeDomainResourceAllocationList) |
| (UE in worse spatial conditions:) | Not Avail | **PAvail** (alternate TimeDomainResourceAllocationList) |

FIG. 2E

SLOT OR SYMBOL RECLASSIFICATION FOR DYNAMICALLY ADAPTED SPATIAL ELEMENTS

TECHNICAL FIELD

The examples and non-limiting example embodiments relate generally to communications and, more particularly, to slot or symbol reclassification for dynamically adapted spatial elements.

BACKGROUND

It is known to manage data transmission resources for mobile devices communication network.

SUMMARY

In accordance with an aspect, a method includes receiving a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

In accordance with an aspect, an apparatus includes at least one processor, and at least one memory storing instructions that, when executed by the at least one processor, cause the apparatus at least to: receive a configuration used to determine availability of at least one slot or at least one symbol based on a spatial pattern of the at least one slot or the at least one symbol; determine the availability of the at least one slot or the at least one symbol based at least on the configuration and the spatial pattern of the at least one slot or the at least one symbol; and apply at least one transmission method or reception method to the at least one slot or the at least one symbol, based on the availability of the at least one slot or the at least one symbol.

In accordance with an aspect, an apparatus includes means for receiving a configuration used to determine availability of at least one slot or at least one symbol based on a spatial pattern of the at least one slot or the at least one symbol; means for determining the availability of the at least one slot or the at least one symbol based at least on the configuration and the spatial pattern of the at least one slot or the at least one symbol; and means for applying at least one transmission method or reception method to the at least one slot or the at least one symbol, based on the availability of the at least one slot or the at least one symbol.

In accordance with an aspect, a non-transitory computer readable medium comprises program instructions that, when executed by an apparatus, cause the apparatus to perform at least the following: receiving a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

In accordance with an aspect, a method includes determining a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

In accordance with an aspect, an apparatus includes at least one processor, and at least one memory storing instructions that, when executed by the at least one processor, cause the apparatus at least to: determine a configuration used to determine availability of at least one slot or at least one symbol based on a spatial pattern of the at least one slot or the at least one symbol; determine the availability of the at least one slot or the at least one symbol based at least on the configuration and the spatial pattern of the at least one slot or the at least one symbol; and apply at least one transmission method or reception method to the at least one slot or the at least one symbol, based on the availability of the at least one slot or the at least one symbol.

In accordance with an aspect, an apparatus includes means for determining a configuration used to determine availability of at least one slot or at least one symbol based on a spatial pattern of the at least one slot or the at least one symbol; means for determining the availability of the at least one slot or the at least one symbol based at least on the configuration and the spatial pattern of the at least one slot or the at least one symbol; and means for applying at least one transmission method or reception method to the at least one slot or the at least one symbol, based on the availability of the at least one slot or the at least one symbol.

In accordance with an aspect, a non-transitory computer readable medium comprises program instructions that, when executed by an apparatus, cause the apparatus to perform at least the following: determining a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

BRIEF DESCRIPTION OF THE DRAWINGS

The foregoing aspects and other features are explained in the following description, taken in connection with the accompanying drawings.

FIG. 2A shows a configuration for dynamic application of UE Tx/Rx.

FIG. 2B shows a configuration for dynamic application of UE Rx/DRX 'on duration'.

FIG. 2C shows a configuration for dynamic application of UE Tx/Rx slot aggregation.

FIG. 2D shows a configuration for dynamic application of a modulation and coding scheme.

FIG. 2E shows configurations for dynamic application of aggregation level on PDCCH, RACH Tx, and SR Tx.

DETAILED DESCRIPTION OF EXAMPLE EMBODIMENTS

Figure 1:
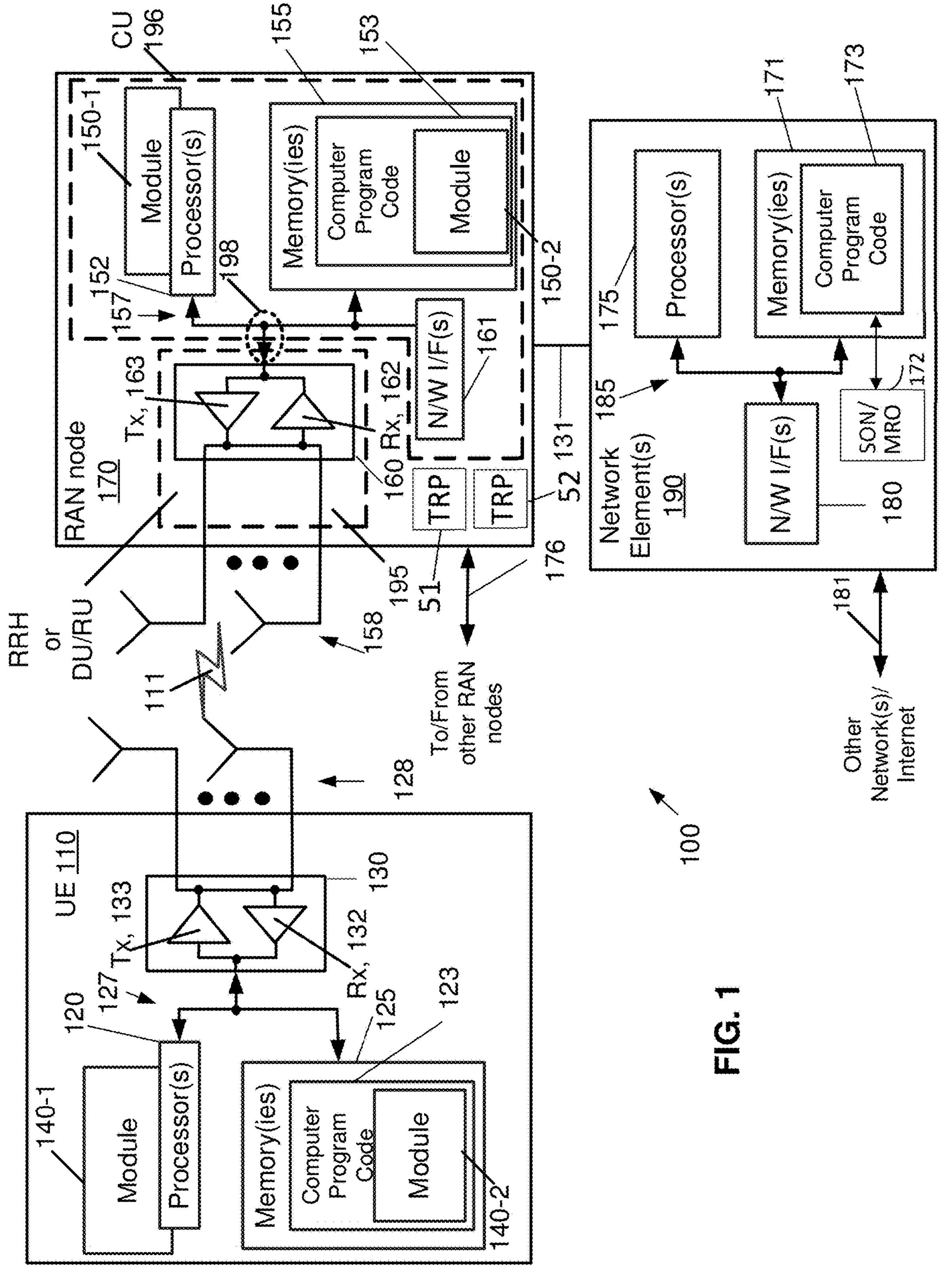
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access for wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell may be supported with one gNB-DU 195, or one cell may be supported/shared with multiple DUs under RAN sharing. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

A RAN node/gNB can comprise one or more TRPs to which the methods described herein may be applied. FIG. 1 shows that the RAN node 170 comprises two TRPs, TRP 51 and TRP 52. The RAN node 170 may host or comprise other TRPs not shown in FIG. 1.

A relay node in NR is called an integrated access and backhaul node. A mobile termination part of the IAB node facilitates the backhaul (parent link) connection. In other words, the mobile termination part comprises the functionality which carries UE functionalities. The distributed unit part of the IAB node facilitates the so called access link (child link) connections (i.e. for access link UEs, and backhaul for other IAB nodes, in the case of multi-hop IAB). In other words, the distributed unit part is responsible for certain base station functionalities. The IAB scenario may follow the so called split architecture, where the central unit hosts the higher layer protocols to the UE and terminates the control plane and user plane interfaces to the 5G core network.

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (mobility management entity)/SGW (serving gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. Computer program code 173 may include SON and/or MRO functionality 172.

The wireless network 100 may implement network virtualization, which is the process of combining hardware and software network resources and network functionality into a single, software-based administrative entity, or a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback devices having wireless communication capabilities, internet appliances including those permitting wireless internet access and browsing, tablets with wireless communication capabilities, head mounted displays such as those that implement virtual/augmented/mixed reality, as well as portable units or terminals that incorporate combinations of such functions. The UE 110 can also be a vehicle such as a car, or a UE mounted in a vehicle, a UAV such as e.g. a drone, or a UE mounted in a UAV. The user equipment 110 may be terminal device, such as mobile phone, mobile device, sensor device etc., the terminal device being a device used by the user or not used by the user.

UE 110, RAN node 170, and/or network element(s) 190, (and associated memories, computer program code and modules) may be configured to implement (e.g. in part) the methods described herein, including slot or symbol reclassification for dynamically adapted spatial elements. Thus, computer program code 123, module 140-1, module 140-2, and other elements/features shown in FIG. 1 of UE 110 may implement user equipment related aspects of the examples described herein. Similarly, computer program code 153, module 150-1, module 150-2, and other elements/features shown in FIG. 1 of RAN node 170 may implement gNB/TRP related aspects of the examples described herein. Computer program code 173 and other elements/features shown in FIG. 1 of network element(s) 190 may be configured to implement network element related aspects of the examples described herein.

Having thus introduced a suitable but non-limiting technical context for the practice of the example embodiments, the example embodiments are now described with greater specificity.

Network energy saving is of great importance for environmental sustainability, to reduce environmental impact such as greenhouse gas emissions, and for operational cost savings. As 5G is becoming pervasive across industries and geographical areas, handling more advanced services and applications requiring very high data rates (e.g. XR), networks are being denser, using more antennas, having larger bandwidths and using more frequency bands. The environmental impact of 5G needs to stay under control, and novel solutions to improve network energy savings need to be developed.

A study on network energy savings was carried out in 3GPP Rel.18 (RP-213554) and documented in TR 38.864. The focus is on the radio access network (NW) which consumes the largest part of the total energy consumption in the network and aims at identifying adaptation techniques of transmissions and/or receptions in time, frequency, spatial, and power domains, with potential support/feedback from the UE, potential UE assistance information, and information exchange/coordination over network interfaces.

Energy consumption has become a key part of the operators' OPEX. According to a report from GSMA, the energy cost on mobile networks may account for approximately 23% of the total operator cost. Most of the energy consumption comes from the radio access network and in particular from the Active Antenna Unit (AAU), with data centers and fiber transport accounting for a smaller share. The power consumption of a radio access can be split into two parts: the dynamic part which is only consumed when data transmission/reception is ongoing, and the static part which is consumed all the time to maintain the necessary operation of the radio access devices, even when the data transmission/reception is not ongoing.

Secondarily, note that when on cell battery backup, there is even more need for network energy savings: when a gNB in emergency/battery backup system coverage/QoS may be reduced to further "stretch" energy available; for example, if an emergency takes down the power grid, and base stations start running on batteries, the battery backup capacity of base transceiver stations (BTSs) (e.g. for approximately 4 hours) are at the limit/not sufficient for 'typical' power outages, and as such a power outage may often result in network outage; there is a need to extend network operation time during emergency/power outage of a RAN site with the existing battery capacity by enabling further reduction of network energy use with supervised impact to the end-user.

Based on the outcome of the study item a 3GPP NR release 18 work item on network energy saving (RP-223540) was defined. The work item includes the following objectives:

2. Specify enhancement on cell DTX/DRX mechanism including the alignment of cell DTX/DRX and UE DRX in RRC_CONNECTED mode, and inter-node information exchange on cell DTX/DRX [RAN2, RAN1, RAN3]
3. Specify the following techniques in spatial and power domains
   Specify necessary enhancements on CSI and beam management related procedures including measurement and report, and signaling to enable efficient adaptation of spatial elements (e.g. antenna ports, active transceiver chains) [RAN1, RAN2]

The spatial elements are expected to change dynamically in response to changing UE communication and RF needs.

The problem addressed by the examples described herein is that when the spatial elements, or more generally the spatial pattern, (e.g., antenna ports, active transceiver chains, antenna elements, energy/power level) is changing dynamically, e.g. in response to different coverage requirements among UEs being scheduled, there is a need to efficiently manage available and preferred slots/symbols, and UE Rx and DRX states.

A change in the spatial pattern may represent (or include) a change in one or more of the following: one or more spatial element muting patterns; numbers or sets of active or muted spatial elements, one or more numbers or sets of (active or muted) antenna ports; one or more report or codebook or spatial configurations; one or more CSI-RS resources or resource sets; value(s) of one or more parameters or configurations for a CSI-RS resource or CSI-RS resource set; one or more energy (or power) levels or energy saving levels; numbers or sets of active or muted spatial elements; one or more numbers or sets of (active or muted) antenna ports; one or more report or codebook or spatial configurations; one or more CSI-RS resources or resource sets; value(s) of one or more parameters or configurations for a CSI-RS resource or CSI-RS resource sets; one or more energy/power levels or energy saving levels; one or more sets of transmission configuration indicator (TCI) states; and/or the like; one or more antenna panels. It is noted that two spatial patterns may or may not be overlapping in terms of corresponding (active/muted) spatial elements. It is noted that cell DTX/DRX may be considered as a (special) spatial pattern where all spatial elements are muted.

Reducing the spatial elements can save significant network energy, but may also result in having to adapt the UE classification of available slots in order to best utilize the new spatial elements and avoid e.g. the UE in bad spatial conditions trying to communicate (Tx/Rx) when spatial elements are reduced (e.g. to 16).

However, repeatedly signaling to the UEs to switch the available slot (UE DRX, Tx/RX) availability classification/usage information each time the spatial elements change adds signaling overhead.

The examples described herein, at a high level, define rules and/or indications for slot or symbol classification when the UE 110 determines that the antenna spatial element configuration (e.g. antenna ports, active transceiver chains) has dynamically changed. The example embodiments based on the number of antenna spatial elements (16 vs 64) are non-limiting examples. The UE determines slot(s)/symbol(s) availability (referred to here as PAvail,SAvail, NotAvail) as a function of the number of spatial elements or applicable spatial pattern and goodness (e.g. binary 'good' or 'not good' or non-binary goodness) of the UE's spatial conditions, such as channel quality or channel state information, where PAvail=primary available slot/symbol, SAvail=secondary available slot/symbol, NotAvail=not available slot/symbol. The UE then uses that new slot/symbol availability (PAvail,SAvail,NotAvail) with preconfigured "rules" and/or indications for determining UE DRX/DTX (discontinuous reception/transmission) and/or for determining or adapting the configuration to consider for UE transmissions/receptions (Tx/Rx). Determinations are made for UE DRX, ('On duration' skips less available slots/symbols in order to preferably overlap with PAvail slots/symbols)—see FIG. 4 and FIG. 5, and for slot aggregation or UL and/or DL repetitions (e.g. PUSCH/PDSCH repetitions), CG (configured grant PUSCH and/or PDSCH)—see FIG. 6A, FIG. 6B, FIG. 6C. and FIG. 6D, for 64/256 QAM (i.e., 64 MCS table/256 MCS table) and DFT-S/TP e.g. use of DFT-S-OFDM waveform/transform precoding—see FIG. 7A, PDCCH Aggregation Level—see FIG. 7B, PUCCH Rep (PUCCH repetition), RACH—see FIG. 7C, SR—see FIG. 7D, and TimeDomainResourceAllocationList—see FIG. 7E.

For SAvail or PAvail slots/symbols, there are also the following embodiments: some aggregation level(s) (AL) may be discarded, i.e., PDCCH candidates with such AL is not monitored. Some search space set(s) (SSS) may be discarded, e.g., UE not monitoring PDCCH on this set or these sets. Control resource set(s) (CORESET) may be discarded, i.e., UE not monitoring PDCCH for such CORESET.

After a change in number of spatial elements or in spatial pattern by the gNB 170, UE 110 applies availability determination/usage rules (e.g. preconfigured rules) and/or indications for determining availability of the upcoming slot(s)/symbol(s).

Determination of availability of slot/symbols is based on availability determination rules, which are based on the spatial pattern (e.g. number of spatial elements), and can also be based on the UE's spatial conditions, e.g. see FIG. 2A having configuration 210. Then the configuration related to UE Tx/Rx is based on availability usage rules related to UE Tx/Rx to control when a limited Tx/Rx is used.

These limited Tx/Rx approaches may include e.g. UE On duration, UL and/or DL repetitions, CG (configured grant PUSCH and/or PDSCH), 64 QAM (i.e., 64 MCS table, as opposed to default of 256 QAM/256 MCS table), DFT-S/TP (e.g. use of DFT-S-OFDM waveform/transform precoding as opposed to default of TP off/CP-OFDM), PDCCH aggregation level (e.g. use of higher PDCCH AL such as AL8 as opposed to default of lower AL such as AL4), PUCCH Rep (PUCCH repetition), RACH Tx, SR Tx, and an alternate TimeDomainResourceAllocationList (e.g. which may be configured to allow DCI to grant larger numbers of Slot Aggregation repetitions). Availability usage rules examples are in FIGS. 2B, 2C, 2D and 2E (where FIG. 2E has configurations 250, 260, 270) where the "limited" Tx/Rx approach is limited to PAvail slots and/or symbols, and in SAvail slots and/or symbols a default Tx/Rx approach, which is not the "limited" Tx/Rx approach, may be used. However, in the cases shown in FIGS. 2B and 2C, if there are insufficient PAvail slots and/or symbols for that limited Tx/Rx (e.g. On Duration) within a time frame then that limited Tx/Rx can use SAvail slots and/or symbols (e.g. if there are no PAvail slots and/or symbols for the prior and/or next longer interval), i.e. the "limited" Tx/Rx approach can be used in SAvail slots and/or symbols. The default approach of FIGS. 2B, 2C, 2D and 2E, includes UE Tx/Rx where e.g. not in UE On duration, no UL and/or DL repetitions, no CG (configured grant PUSCH and/or PDSCH), 256 QAM/256 MCS table (not 64 QAM/64 MCS table), TP (transform precoding) OFF (e.g. use of CP-OFDM waveform not TP ON), not use higher PDCCH aggregation level (e.g. not use of higher PDCCH AL, and instead use default including AL4), not use PUCCH Rep (PUCCH repetition), not use/allow RACH Tx, not use/allow SR Tx, and use default (e.g. default/baseline TimeDomainResourceAllocationList (e.g. which may be configured to allow DCI to grant smaller numbers of Slot Aggregation repetitions).

The UE 110 may become aware of spatial elements or spatial pattern changes based upon indication (via RRC, MAC CE, and/or DCI) from the gNB 170, e.g. dedicated GC (group common) RNTI, and/or periodic spatial partitioning (i.e., cycle of spatial patterns).

The preconfigured availability determination/usage rules and/or indications can further include or involve the UE's spatial conditions (e.g. a quality or "goodness" of the UE's spatial conditions). Changes in the UE's spatial condition "goodness" can be updated with signaling to or from the UE, including with UE assistance indication/CSI, DCI selecting a row in a TDRA table (slot aggregation or UL and/or DL repetitions), or 64/256 QAM or TP on/off (i.e., 64 MCS table/256 MCS table), and DFT-S/TP (use of DFT-S-OFDM waveform/transform precoding).

In certain example embodiments, the gNB 170 and UE 110 use the spatial elements or applicable spatial pattern (and goodness of the UE's spatial conditions) to determine the slot/symbol availability (PAvail, SAvail, NotAvail) according to availability determination/usage rules pre-agreed/configured between gNB 170 and UE(s) 110. Alternatively, the gNB 170 may determine and indicate/update (e.g., via MAC CE or DCI) the UE 110 with a pattern or cycle, covering multiple slots or symbols (and where this cycle is repeating in time) of slot/symbol availability thus avoiding frequent signaling of the slot/symbol availability and/or slot/symbol availability usage with respect to UE DRX and/or UE Tx/Rx.

Preconfigured rules (refer to the rules for availability determination (FIG. 2A) and availability usage rules (FIG. 2B, FIG. 2C, FIG. 2D, FIG. 2E) as further described herein) and/or indications are used for determining which slots have what availability, and for determining the UE Tx/Rx impact of each level of availability. The UE 110 then uses that new slot/symbol availability (PAvail, SAvail, NotAvail) as the availability applies to UE DRX/UE Tx/Rx, where these preconfigured rules and/or indications comprise at least one of: UE Rx/DRX 'on duration' determination of/limitation to "available slots" (UE not sleeping), UE Tx/Rx configuration determination/limitation to "available slots", or UE Tx with 64 QAM/TP on, etc.

UE Rx/DRX/DTX 'on duration' determination of/limitation to "available slots" (e.g., UE not sleeping) may be based on 'On duration'/'active time' aligned/limited to PAvail slots/symbols, skipping other less available slots/symbols (e.g., SAvail, NotAvail slots/symbols). However, if insufficient PAvail slots are available within a given time frame, then preconfigured rules and/or indications further provide for using SAvail slots as a secondary choice for 'on duration'. Refer to example rule configuration 220 shown in FIG. 2B (also shown below).

| Slot is determined to be "Available" for Rx (On Duration): Availability usage: Available during PAvail for limited Tx/Rx (e.g. On Duration), and in SAvail use default | Spatial element configuration | |
|---|---|---|
| (not use On Duration), But if insufficient PAvail slots for that limited Tx/Rx (e.g. On Duration) within a time frame then that limited Tx/Rx can use SAvail. | slot and/or symbol configured with 16 spatial elements | slot and/or symbol configured with 16 spatial elements |
| UE in better spatial conditions: | PAvail (OnDuration) | SAvail |
| UE in worse spatial conditions: | Not Avail | PAvail (OnDuration) |

Figure 4:
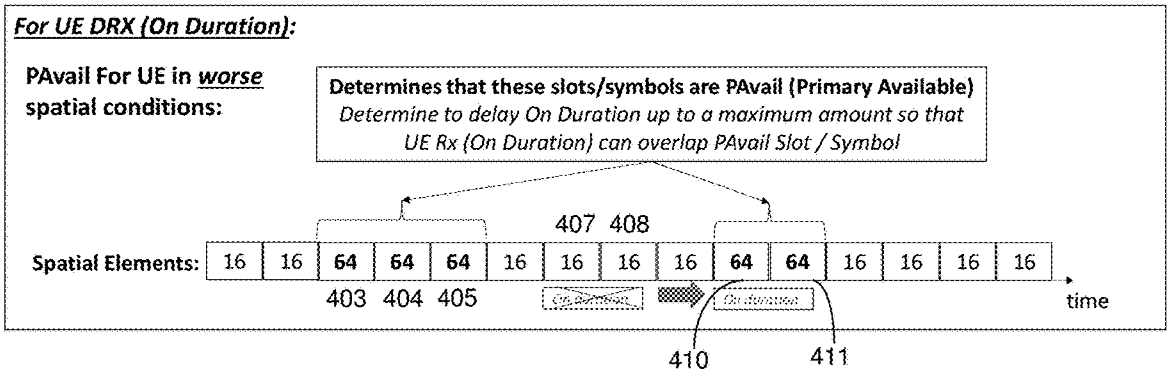
FIG. 4 depicts a temporal view of the response to changes in spatial elements, for a UE in worse spatial conditions.
Figure 5:
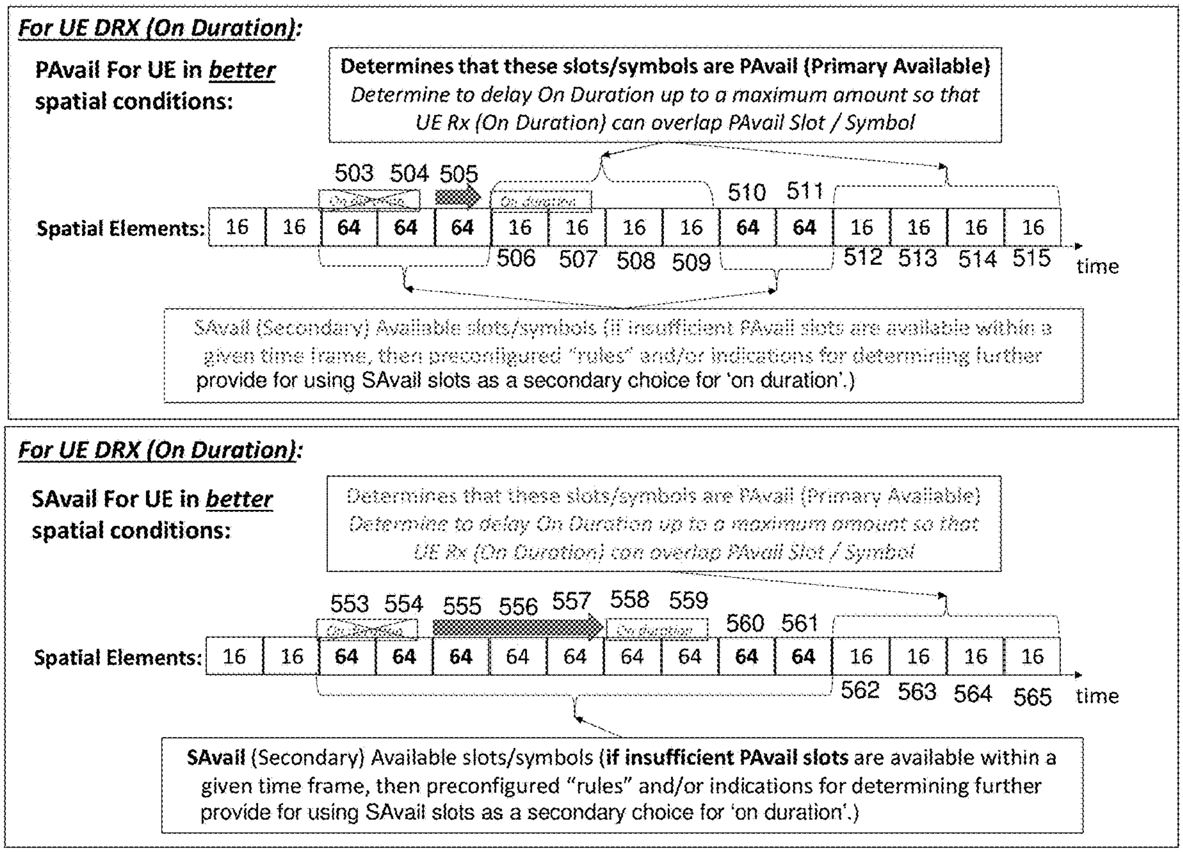
FIG. 5 depicts temporal views of the response to changes in spatial elements, for a UE in better spatial conditions.
Figure 6A:
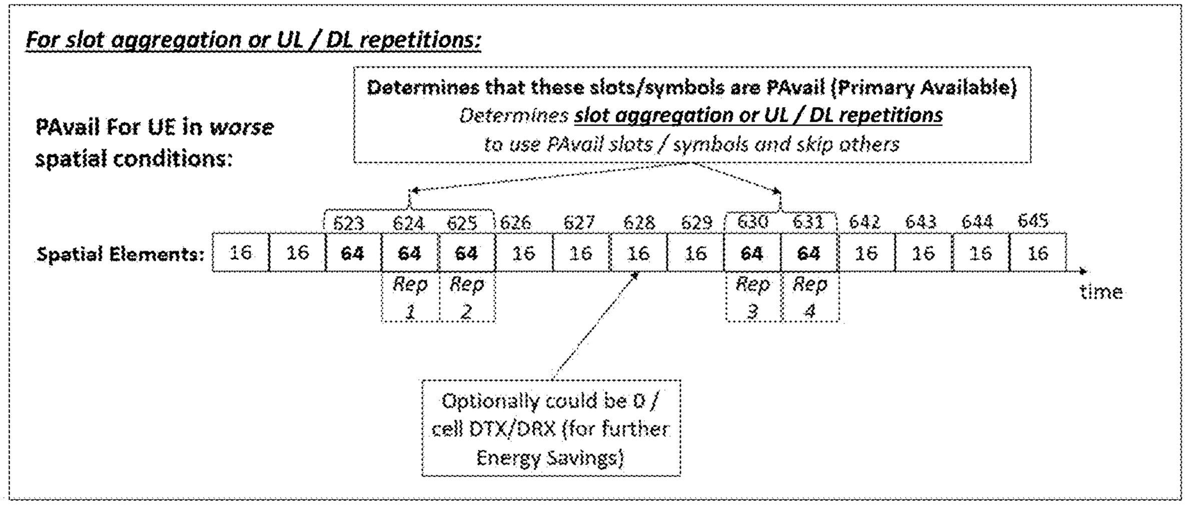
FIG. 6A depicts temporal views of the response to changes in spatial elements, for slot aggregation UL/DL.
Figure 6B:
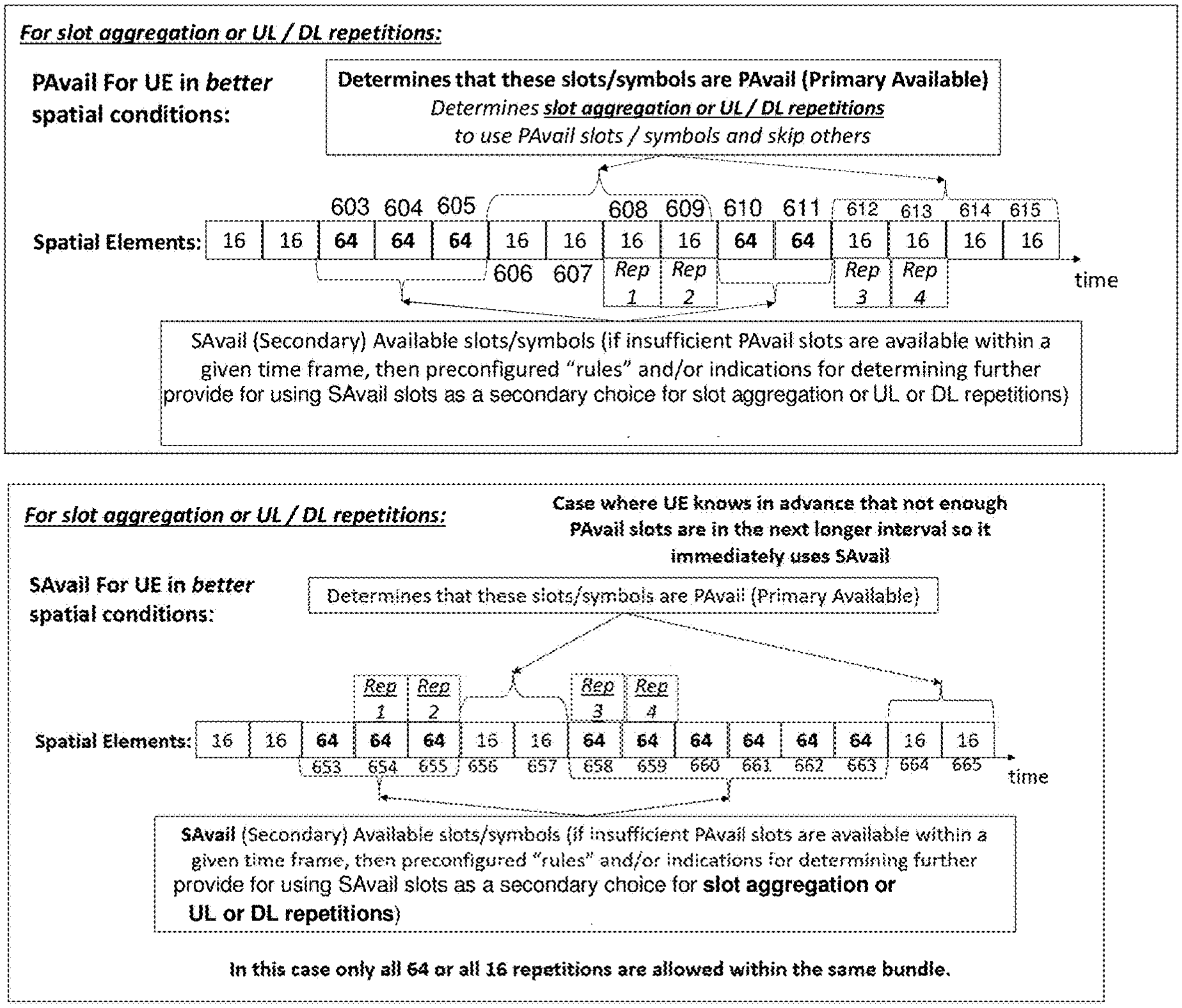
FIG. 6B depicts temporal views of the response to changes in spatial elements, for slot aggregation UL/DL repetitions cases as labeled in each sub-figure.
Figure 6C:
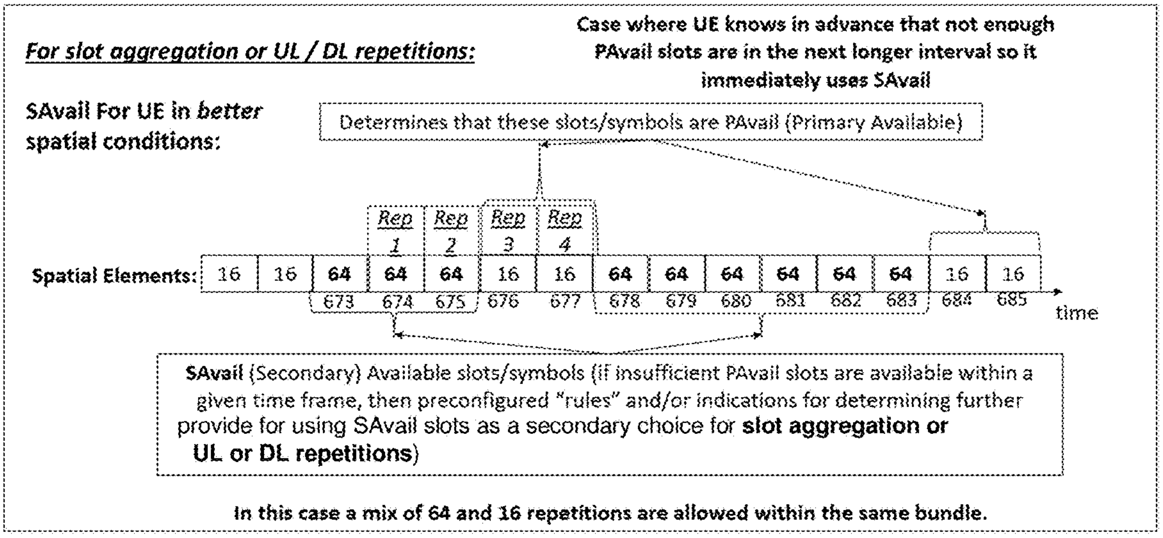
FIG. 6C depicts temporal views of the response to changes in spatial elements, for slot aggregation UL/DL.
Figure 6D:
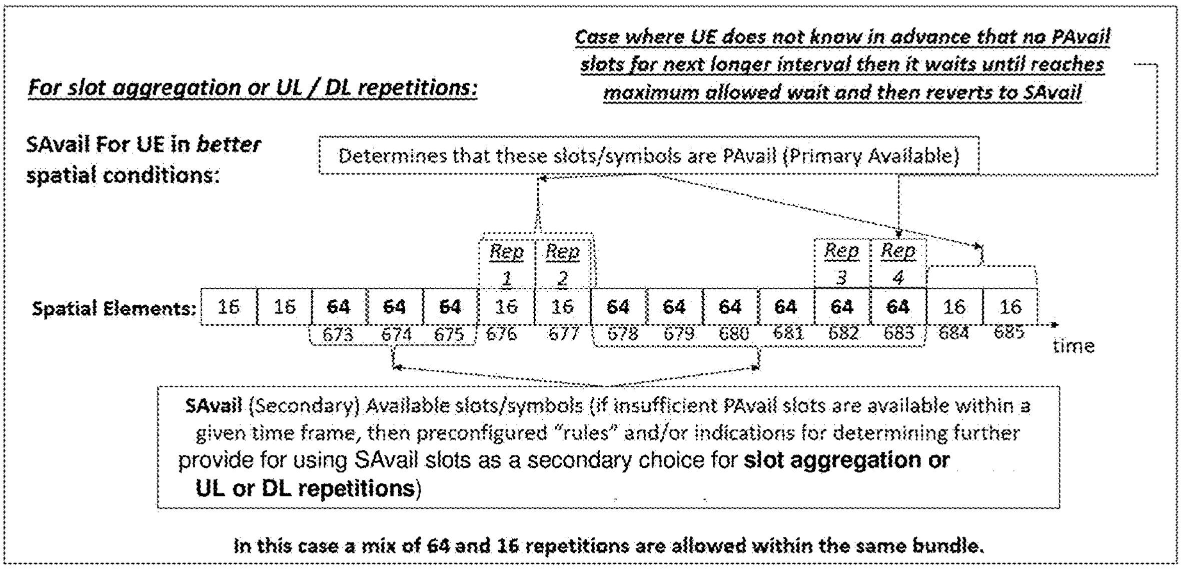
FIG. 6D depicts temporal views of the response to changes in spatial elements, for slot aggregation UL/DL.
Figure 7A:
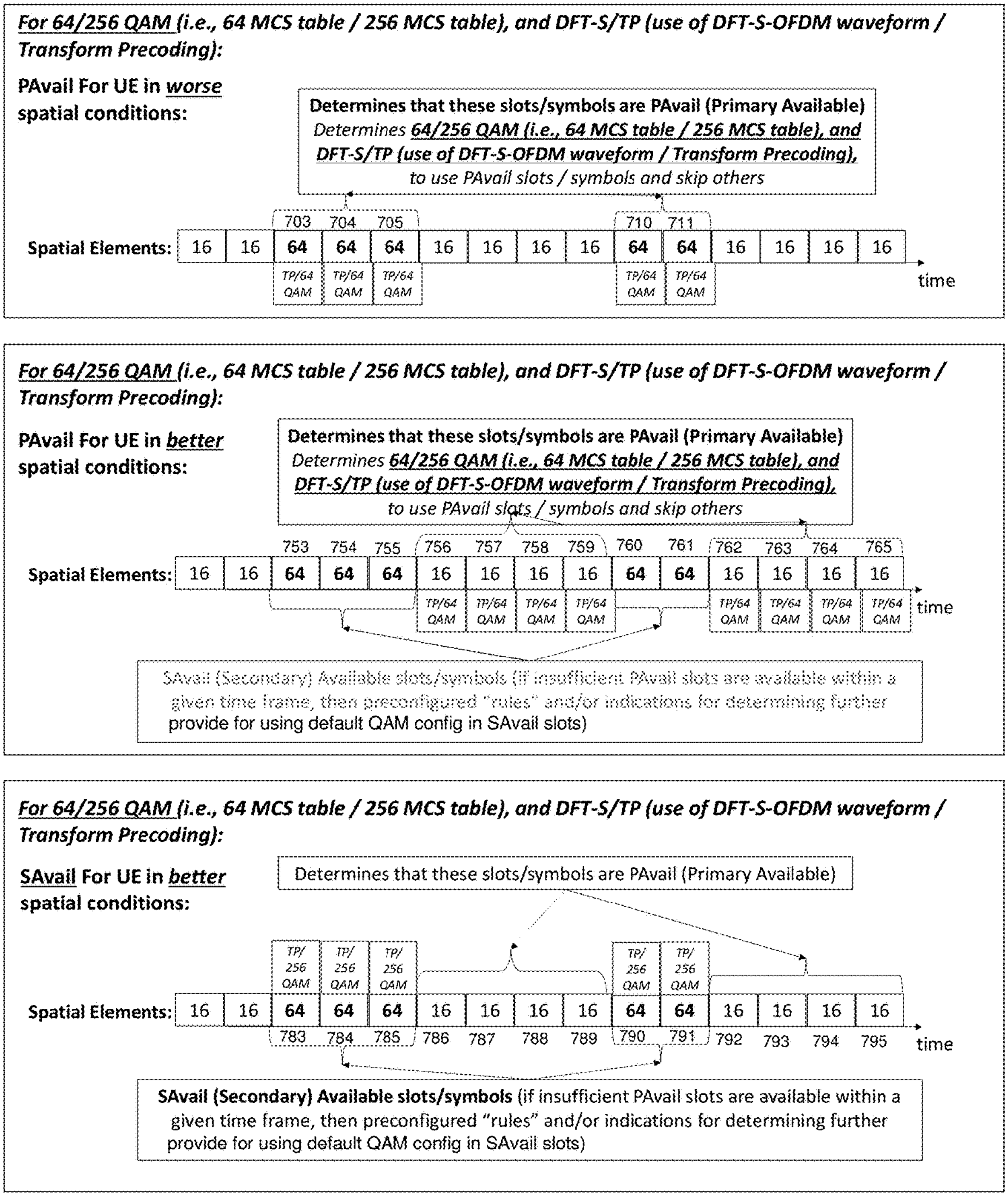
FIG. 7A depicts a temporal view of the response to changes in spatial elements, for 64/256 QAM cases as labeled in each sub-figure.
Figure 7B:
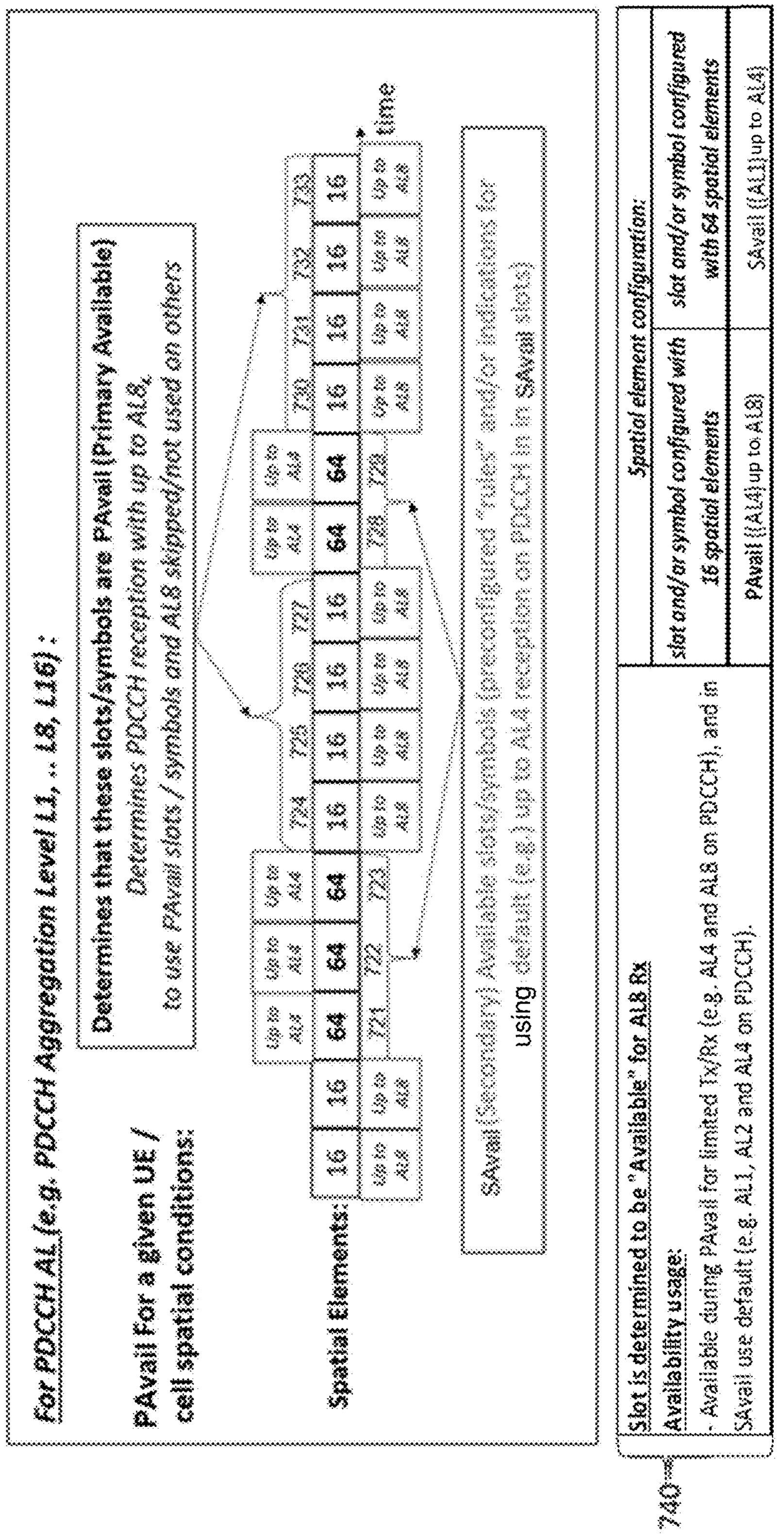
FIG. 7B depicts a PDCCH aggregation level embodiment.
Figure 7C:
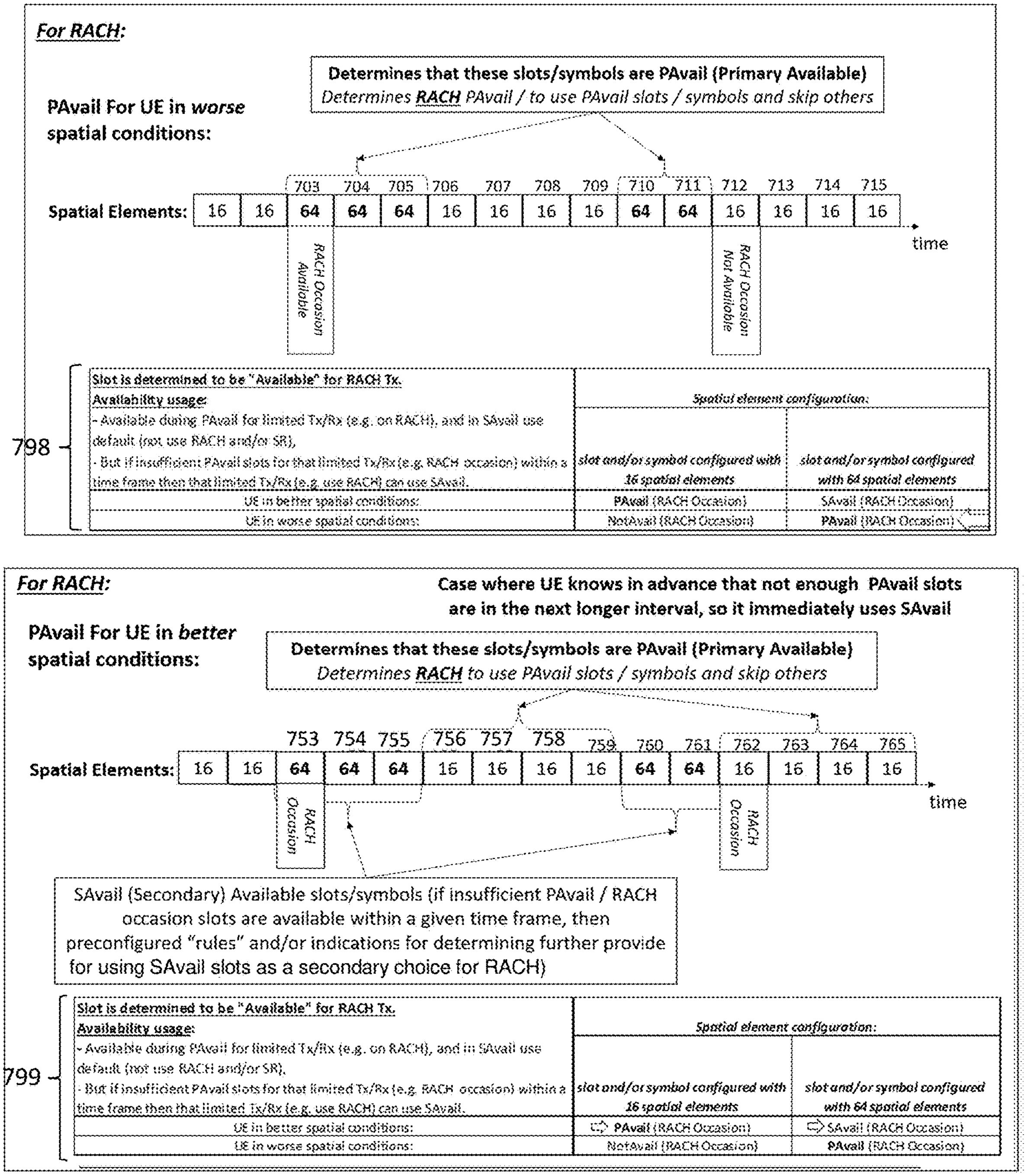
FIG. 7C depicts a RACH embodiment.
Figure 7D:
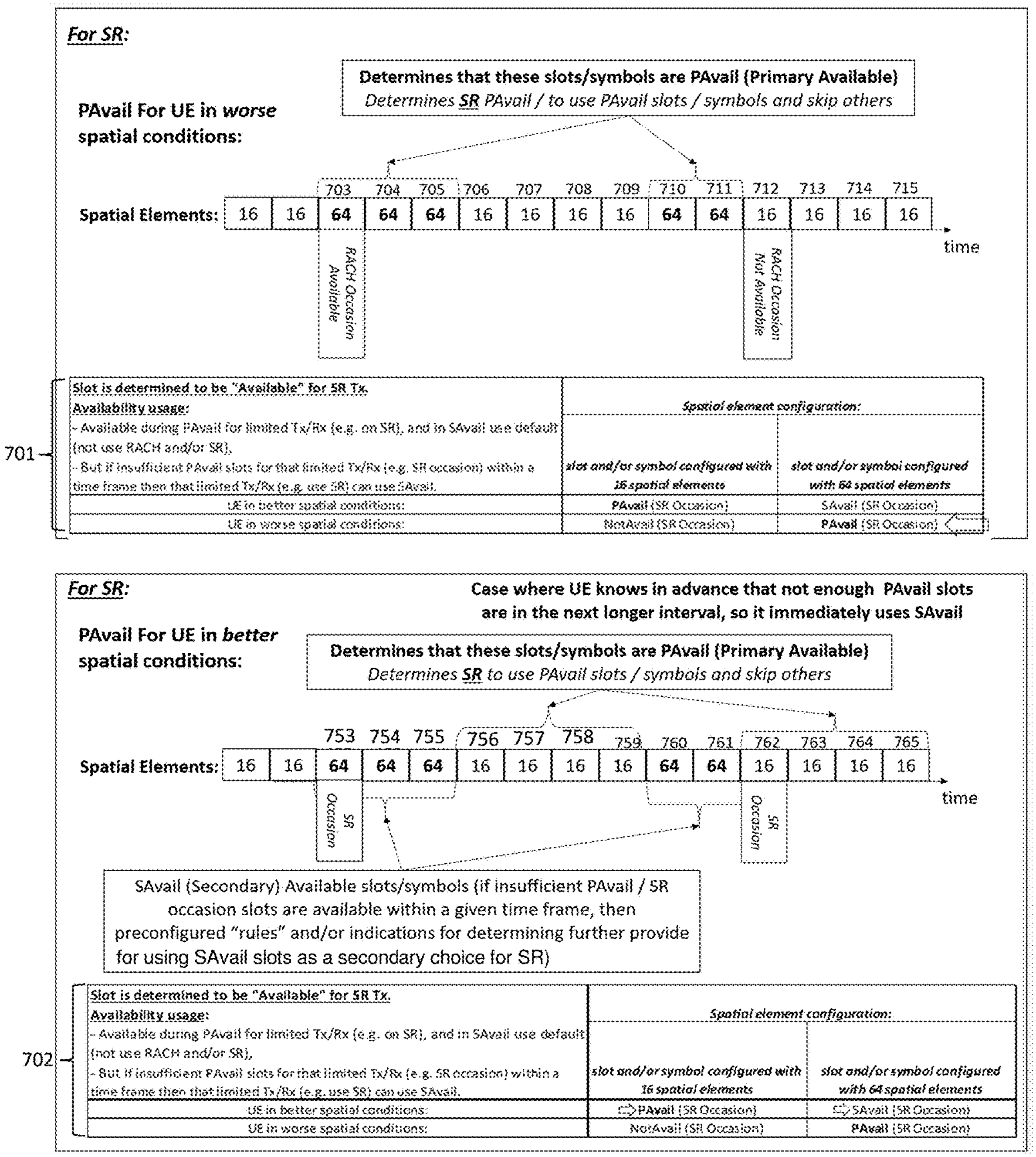
FIG. 7D depicts a SR embodiment.

UE Tx/Rx configuration determination/limitation to "available slots" may be based on UE DRX, ('On duration' skips less available slots/symbols in order to overlap with PAvail slots/symbols)—refer to FIG. 4, and FIG. 5, 64/256 QAM (i.e., 64 MCS table/256 MCS table), and DFT-S/TP (use of DFT-S-OFDM waveform/Transform Precoding)—refer to FIG. 7A, or Slot Agg (slot aggregation or UL and/or DL repetitions)—refer to FIGS. 6A, 6B, 6C, and 6D, CG (configured grant PUSCH and/or PDSCH), PUCCH Rep (PUCCH repetition), RACH Occasions—refer to FIG. 7C, and SR Occasions—refer to FIG. 7D. Refer to example rule configuration 230 shown in FIG. 2C (also shown below).

| Slot is determined to be "Available" for Tx/Rx (Slot Agg (slot aggregation or UL or DL repetitions), CG (configured grant PUSCH and/or PDSCH), PUCCH Rep (PUCCH repetition), SR, and RACH): Availability usage: Available during PAvail for limited Tx/Rx (e.g. Slot Agg (slot aggregation or UL and/or DL repetitions), CG (configured grant PUSCH and/or PDSCH), PUCCH Rep (PUCCH repetition), SR and RACH), and in SAvail use default (not using that limited Tx/Rx), But if insufficient PAvail slots for that limited Tx/Rx (e.g. repetition, | Spatial element configuration | |
|---|---|---|
| CG, SR, or RACH occasion/opportunity) within a time frame then that limited Tx/Rx (see above) can use SAvail. | slot and/or symbol configured with 16 spatial elements | slot and/or symbol configured with 64 spatial elements |
| UE in better spatial conditions: | PAvail (SAg/CG/PUCCH/SR/RACH) | SAvail (SAg/CG/PUCCH/SR/RACH) |
| UE in worse spatial conditions: | Not Avail (SAg/CG/PUCCH/SR/RACH) | PAvail (SAg/CG/PUCCH/SR/RACH) |

UE Tx or Rx with 64 QAM and/or 'TP on' may be based on UE use of 64 QAM (i.e., 64 MCS table) and DFT-S/TP (use of DFT-S-OFDM waveform/transform precoding)) limited to PAvail slots/symbols. Refer to example rule configuration 240 shown in FIG. 2D (also shown below).

| Slot is determined to be "Available" for 64 QAM (i.e., 64 MCS table / 256 MCS table) / TP (DFT-S-OFDM waveform / Transform Precoding). Availability usage: | Spatial element configuration | |
|---|---|---|
| Available during PAvail for limited Tx/Rx (e.g. 64 QAM (i.e., 64 MCS table) / TP (Tranform Precoding)), and in SAvail use default (e.g. 256 QAM / 256 MCS table) / TP (Transform Precoding) OFF / CP-OFDM). | slot and/or symbol configured with 16 spatial elements | slot and/or symbol configured with 64 spatial elements |
| UE in better spatial conditions: | PAvail (64/TP ON) | SAvail (256/TP Off) |
| UE in worse spatial conditions: | | PAvail (64/TP ON) |

UE Rx of grant with DCI corresponding to an alternate TimeDomainResourceAllocationList (e.g. which may be configured to allow DCI to grant larger numbers of Slot Aggregation repetitions) may be limited to PAvail slots/symbols. Refer to example rule configuration 280 shown in FIG. 2E (also shown below).

| Slot is determined to be "Available" for an alternate TimeDomainResourceAllocationList (e.g. which maybe configured to allow DCI to grant larger numbers of Slot Aggregation repetitions). Availability usage: Available during PAvail for limited Tx/Rx (e.g. alternate TimeDomainResourceAllocationList), and in SAvail use default (e.g. normal TimeDomainResourceAllocationList). | Spatial element configuration | |
|---|---|---|
| | slot and/or symbol configured with 16 spatial elements | slot and/or symbol configured with 64 spatial elements |
| UE in better spatial conditions: | PAvail (alternate TimeDomainResourceAllocationList) | SAvail (default TimeDomainResourceAllocationList) |
| UE in worse spatial conditions: | | PAvail (alternate TimeDomainResourceAllocationList) |

Figure 3:
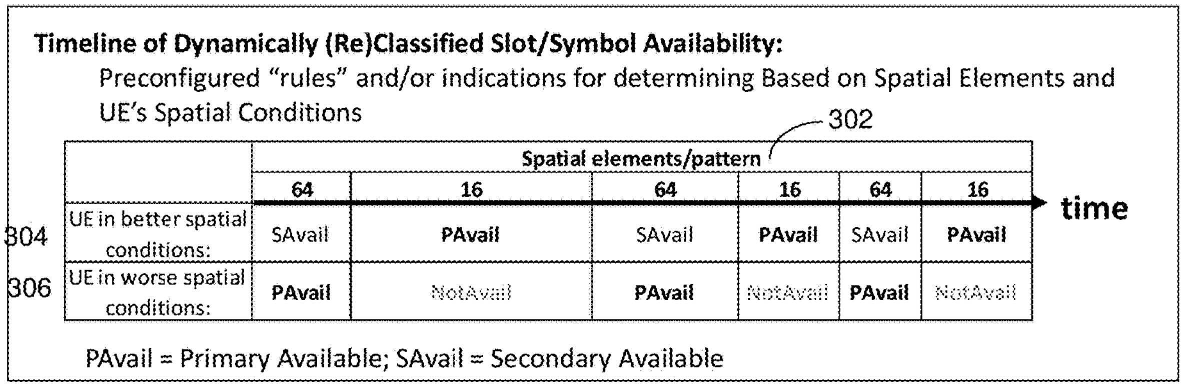
FIG. 3 depicts a temporal view of the application of preconfigured rules and/or indications for determining slot or symbol availability in response to dynamic changes in spatial elements.

FIG. 3 illustrates an example temporal view of the application of these preconfigured rules and/or indications for determining slot/symbol availability in response to dynamic changes in number of spatial elements or spatial pattern. As shown in FIG. 3, the slot or symbol is classified as either primary available, secondary available, or not available over time, depending on the number of spatial elements or spatial element pattern (302) configured for the slot/symbol and the UE being in better spatial conditions (304) or the UE being in worse spatial conditions (306).

FIG. 4 illustrates an example temporal view of the application of these preconfigured rules and/or indications for determining slot or symbol availability in response to dynamic changes in spatial elements, for a UE in worse spatial conditions. In this example, from the rule configuration 220 of FIG. 2B and the timeline of FIG. 3 it was determined (by UE 110 or gNB 170) that for a UE 110 in worse spatial conditions, when the number of spatial elements for a slot is 64, the slot is classified as primary available. Therefore, the UE 110 when in worse spatial conditions determines that 'on duration' is applicable to slots 403, 404, and 405. Furthermore, the 'on duration' is delayed, as the 'on duration' previously applicable to slots 407 and 408 is delayed so that 'on duration' is now applicable to slots 410 and 411.

FIG. 5 illustrates an example temporal view of the application of these preconfigured rules for slot or symbol availability in response to dynamic changes in spatial elements, for a UE 110 in better spatial conditions. In this example, from rule configuration 220 of FIG. 2B and the timeline of FIG. 3 it was determined by the UE 110 or gNB 170 that for a UE 110 in better spatial conditions, when the number of spatial elements for a slot or symbol is 64, the slot or symbol is classified as secondary available. Therefore, when the UE 110 is in better spatial conditions, the UE 110 or gNB 170 determines to delay 'on duration' for three slots or symbols (e.g. time slots or symbols) including slots or symbols 503, 504, and 505 which are determined to be secondary available. Because slots or symbols 506 and 507 have 16 spatial elements, slots or symbols 506 and 507 are determined to be primary available and therefore 'on duration' overlaps slots or symbols 506 and 507. Due to the rules specified in FIG. 2B and FIG. 3, when the UE 110 is in better spatial conditions, the UE 110 or gNB 170 determines slots or symbols 506, 507, 508, 509, 512, 513, 514, and 515, each associated with 16 spatial elements, to be primary available and slots or symbols 510 and 511, each associated with 64 spatial elements, to be secondary available.

Referring to FIG. 5, from the rules specified in FIG. 2B (item 220) and FIG. 3, when the UE 110 is in better spatial conditions, the UE 110 or gNB 170 determines slots or symbols 553, 554, 555, 556, 557, 558, 559, 560, and 561, each associated with 64 spatial elements, to be secondary available and slots or symbols 562, 563, 564, and 565, each associated with 16 spatial elements, to be primary available. Therefore, when the UE 110 is in better spatial conditions, the UE 110 determines to delay 'on duration' for DRX to not overlap with slots or symbols 553 and 554. During the delay, the UE 110 determines slots or symbols 555, 556, 557, 558, and 559 as being secondary available. However, in this example the maximum delay is 5 slots or symbols, so the 'on duration' for DRX is applied to slots 558 and 559 even though they are not determined to be primary available. If any of 555, 556, or 557 were to be associated with 16 spatial elements, then the on duration for DRX would have been applied to a set of slots or symbols comprising slots or symbols 555, 556, and 557, as those slots or symbols would have been classified as primary available.

FIG. 6A depicts an example temporal view of the response to changes in spatial elements, for slot aggregation or UL and/or DL repetitions (e.g. PUSCH/PDSCH repetitions). From the rule configuration 230 of FIG. 2C and the timeline shown in FIG. 3, when the UE 110 is in worse spatial conditions, the UE 110 or gNB 170 determines slots or symbols 623, 624, 625, 630, and 631 associated with 64 spatial elements to be primary available, and slots or symbols 626, 627, 628, 629, 642, 643, 644, and 645 to be secondary or not available. Furthermore, based on the rule configuration 230, the UE 110 or gNB 170 determines to aggregate or repeat for downlink slots or symbols 624 and 625 and slots or symbols 630 and 631, and to skip other slots or symbols including those determined to be secondary or not available.

FIG. 6B illustrates an example temporal view of the application of preconfigured rules for slot or symbol availability in response to dynamic changes in spatial elements, for slot aggregation or UL and/or DL repetitions cases (e.g.

PUSCH/PDSCH repetitions) as labeled in each sub-figure. From the rule configuration 230 of FIG. 2C and the timeline shown in FIG. 3, when the UE 110 is in better spatial conditions, the UE 110 or gNB 170 determines slots or symbols 603, 604, 605, 610, and 611 associated with 64 spatial elements to be secondary available, and slots or symbols 606, 607, 608, 609, 612, 613, 614, and 615 to be primary available. Furthermore, based on the rule configuration 230, the UE 110 or gNB 170 determines to aggregate or repeat for downlink slots or symbols 608 and 609 and slots or symbols 612 and 613, and to skip other slots or symbols including those determined to be secondary available. As indicated in FIG. 6B, if insufficient primary available slots are available within a given time frame, then preconfigured rules and/or indications further provide for using secondary available slots as a secondary choice for slot aggregation or UL and/or DL repetitions.

Referring to FIG. 6B, from the rule configuration 230 of FIG. 2C and the timeline shown in FIG. 3, when the UE 110 is in better spatial conditions, the UE 110 or gNB 170 determines slots or symbols 653, 654, 655, 658, 659, 660, 661, 662, and 663 associated with 64 spatial elements to be secondary available, and slots or symbols 656, 657, 664, and 665 to be primary available. Furthermore, based on the rule configuration 230, the UE 110 or gNB 170 determines to aggregate or repeat for uplink slots or symbols 654 and 655 and slots or symbols 658 and 659 even though they are secondary available slots, and to skip other slots or symbols, which determination may be based on there being insufficient primary available slots within a time frame and thus using slots or symbols 654, 655, 658, and 659 that are secondary available. In this example, only repetitions on slots of the same number of spatial elements are allowed within one bundle. In another embodiment, some slots or symbols may have 0 spatial elements/Cell DTX/DRX (for further energy savings), and as such is/are not available for Tx/Rx/repetition(s). In another embodiment, referring to FIG. 6C, the 3rd and 4th repetition could be sent on slots or symbols 676 and 677 if a mix of slots of different numbers of spatial elements is allowed within one bundle. In FIG. 6C, the mix of slots of different numbers of spatial elements is the mix of 674/675 (64 elements) for the 1st and 2nd repetitions with 676/677 (16 elements) for the 3rd and 4th repetitions. Referring to FIG. 6D, if the UE 110 does not know in advance that there will not be enough PAvail slots within a time frame the UE 110 may determine to send on Rep 1 and Rep 2 on slots or symbols 676, 677, and then wait for a time frame and then perform repetition 3 and 4 respectively on slots or symbols 682 and 683, where slots or symbols 682 and 683 are determined as SAvail.

In the example temporal views depicted in FIG. 6C and FIG. 6D, slots or symbols 676, 677, 684, and 685 are determined to be primary available, and slots or symbols 673, 674, 675, 678, 679, 680, 681, 682, and 683 are determined to be secondary available.

FIG. 7A illustrates an example temporal view of the application of these preconfigured rules for slot or symbol availability in response to dynamic changes in spatial elements—for 64/256 QAM (i.e., 64 MCS table/256 MCS table), and DFT-S/TP (use of DFT-S-OFDM waveform/transform precoding) cases as labeled in each sub-figure. From the rule configuration 240 shown in FIG. 2D and the timeline of FIG. 3, when the UE 110 is in worse spatial conditions, the UE 110 or gNB 170 classifies slots or symbols 703, 704, 705, 710, and 711, each associated with 64 spatial elements, to be primary available, and determines TP/64 QAM for slots or symbols 703, 704, 705, 710, and 711 and not for other slots or symbols including for example slots or symbols determined to be secondary available.

Referring to FIG. 7A, from the rule configuration 240 shown in FIG. 2D and the timeline of FIG. 3, when the UE 110 is in better spatial conditions, the UE 110 or gNB 170 classifies slots or symbols 753, 754, 755, 760, and 761, each associated with 64 spatial elements, to be secondary available. Further, when the UE 110 is in better spatial conditions, the UE 110 or gNB 170 classifies slots or symbols 756, 757, 758, 759, 762, 763, 764, and 765, each associated with 16 spatial elements, to be primary available and determines TP/64 QAM for slots or symbols 756, 757, 758, 759, 762, 763, 764, and 765 and not for other slots or symbols including for example those determined to be secondary available. As indicated in FIG. 7A, if insufficient primary available slots are available within a given time frame, then the rules or indications further provide for using a default TP OFF and/or 256 QAM configuration in secondary available slots.

Referring to FIG. 7A, from the rule configuration 240 shown in FIG. 2D and the timeline of FIG. 3, when the UE 110 is in better spatial conditions, the UE 110 or gNB 170 classifies slots or symbols 783, 784, 785, 790, and 791, each associated with 64 spatial elements, to be secondary available. Further, when the UE 110 is in better spatial conditions, the UE 110 or gNB 170 classifies slots or symbols 786, 787, 788, 789, 792, 793, 794, and 795, each associated with 16 spatial elements, to be primary available. From the rule configuration 240 shown in FIG. 2D and the timeline of FIG. 3, the UE 110 or gNB 170 determines TP OFF and/or 256 QAM for slots or symbols 783, 784, 785, 790, and 791, based on using TP OFF and/or 256 QAM for the secondary available slots.

FIG. 7B depicts an example PDCCH aggregation level embodiment including configuration 740, which is shown below:

| | Spatial element configuration | |
|---|---|---|
| Slot is determined to be "Available" for AL8 Rx Availability usage: Available during PAvail for limited Tx/Rx (e.g. AL4 and AL8 on PDCCH), and in SAvail use default (e.g. AL1, AL2 and AL4 on PDCCH | slot and/or symbol configured with 16 spatial elements | slot and/or symbol configured with 64 spatial elements |
| | PAvail ((AL4) up to AL8) | SAvail ((AL1) up to AL4) |

Referring to FIG. 7B, based on the configuration 740, slots or symbols 721, 722, 723, 728, and 729, each associated with a spatial pattern of 64, are determined to be secondary available, and slots or symbols 724, 725, 726, 727, 730, 731, 732, and 733 are determined to be primary available. Thus, based on the configuration 740, an aggregation level of 1, 2, or 4 may be applied to PDCCH occasions during slots or symbols 721, 722, 723, 728, and

729, and an aggregation level of 4 or 8 may be applied to PDCCH occasions during slots or symbols 724, 725, 726, 727, 730, 731, 732, and 733. The aggregation level determines a number of aggregated CCEs (channel control elements), for example, an aggregation level of 2 would mean that 2 CCEs (channel control elements) may be aggregated together for PDCCH DCI (Downlink Control Information) for that UE during that PDCCH occasion, an aggregation level of 4 would mean that 4 CCEs may be aggregated together for PDCCH DCI (Downlink Control Information) for that UE during that PDCCH occasion, etc.

FIG. 7C illustrates an example temporal view of the application of these preconfigured rules for slot or symbol availability in response to dynamic changes in spatial elements—for RACH occasion cases as labeled in each sub-figure. From the timeline of FIG. 3 and the rule configuration 798, when the UE 110 is in worse spatial conditions and is waiting to transmit on RACH, the UE 110 or gNB 170 classifies slots or symbols 703, 704, 705, 710, and 711, each associated with 64 spatial elements, to be primary available, and determines RACH occasions if present as available for slots or symbols 703, 704, 705, 710, and 711 and not for other slots or symbols including for example slots or symbols determined to be secondary available.

Referring to FIG. 7C, from the rule configuration 230 of FIG. 2C or 260 of FIG. 2E, the timeline of FIG. 3, and the rule configuration 799, when the UE 110 is in better spatial conditions and is waiting to transmit on RACH, the UE 110 or gNB 170 classifies slots or symbols 753, 754, 755, 760, and 761, each associated with 64 spatial elements, to be secondary available. Further, when the UE 110 is in better spatial conditions, the UE 110 or gNB 170 classifies slots or symbols 756, 757, 758, 759, 762, 763, 764, and 765, each associated with 16 spatial elements, to be primary available and determines to use RACH occasion(s) if present during slots or symbols 756, 757, 758, 759, 762, 763, 764, and 765 and not for other slots or symbols including for example those determined to be secondary available. As indicated in FIG. 7C, if insufficient primary available RACH occasion slots are available within a given time frame (e.g. for that level of delay tolerance prior to performing RACH), then the rules or indications further provide for using a RACH occasion in secondary available slots e.g. 753. In FIG. 7C, when the UE is in worse spatial conditions, slots 706, 707, 708, 709, 712, 713, 714, and 715, each associated with 16 slots or symbols, are determined to be not available for RACH, based on the configuration 230, the configuration 260, the timeline of FIG. 3, and configuration 798.

FIG. 7D illustrates an example temporal view of the application of these preconfigured rules for slot or symbol availability in response to dynamic changes in spatial elements—for SR occasion cases as labeled in each sub-figure. From the rule configuration 230 of FIG. 2C, the configuration 270 of FIG. 2E, the timeline of FIG. 3, and the rule configuration 701, when the UE 110 is in worse spatial conditions and is waiting to transmit on SR, the UE 110 or gNB 170 classifies slots or symbols 703, 704, 705, 710, and 711, each associated with 64 spatial elements, to be primary available, and determines SR occasions if present as available for slots or symbols 703, 704, 705, 710, and 711 and not for other slots or symbols including for example slots or symbols determined to be secondary available.

Referring to FIG. 7D, from rule configuration 230 of FIG. 2C, the configuration 270 of FIG. 2E, the timeline of FIG. 3, and the rule configuration 702, when the UE 110 is in better spatial conditions is waiting to transmit on SR, the UE 110 or gNB 170 classifies slots or symbols 753, 754, 755, 760, and 761, each associated with 64 spatial elements, to be secondary available. Further, when the UE 110 is in better spatial conditions, the UE 110 or gNB 170 classifies slots or symbols 756, 757, 758, 759, 762, 763, 764, and 765, each associated with 16 spatial elements, to be primary available and determines to use SR occasion(s) if present during slots or symbols from 756, 757, 758, 759, 762, 763, 764, and 765 and not for other slots or symbols including for example those determined to be secondary available. As indicated in FIG. 7D, if insufficient primary available SR occasion slots are available within a given time frame (e.g. for that level of delay tolerance prior to performing SR), then the rules or indications further provide for using a SR occasion in secondary available slots e.g. 753.

Figure 7E:
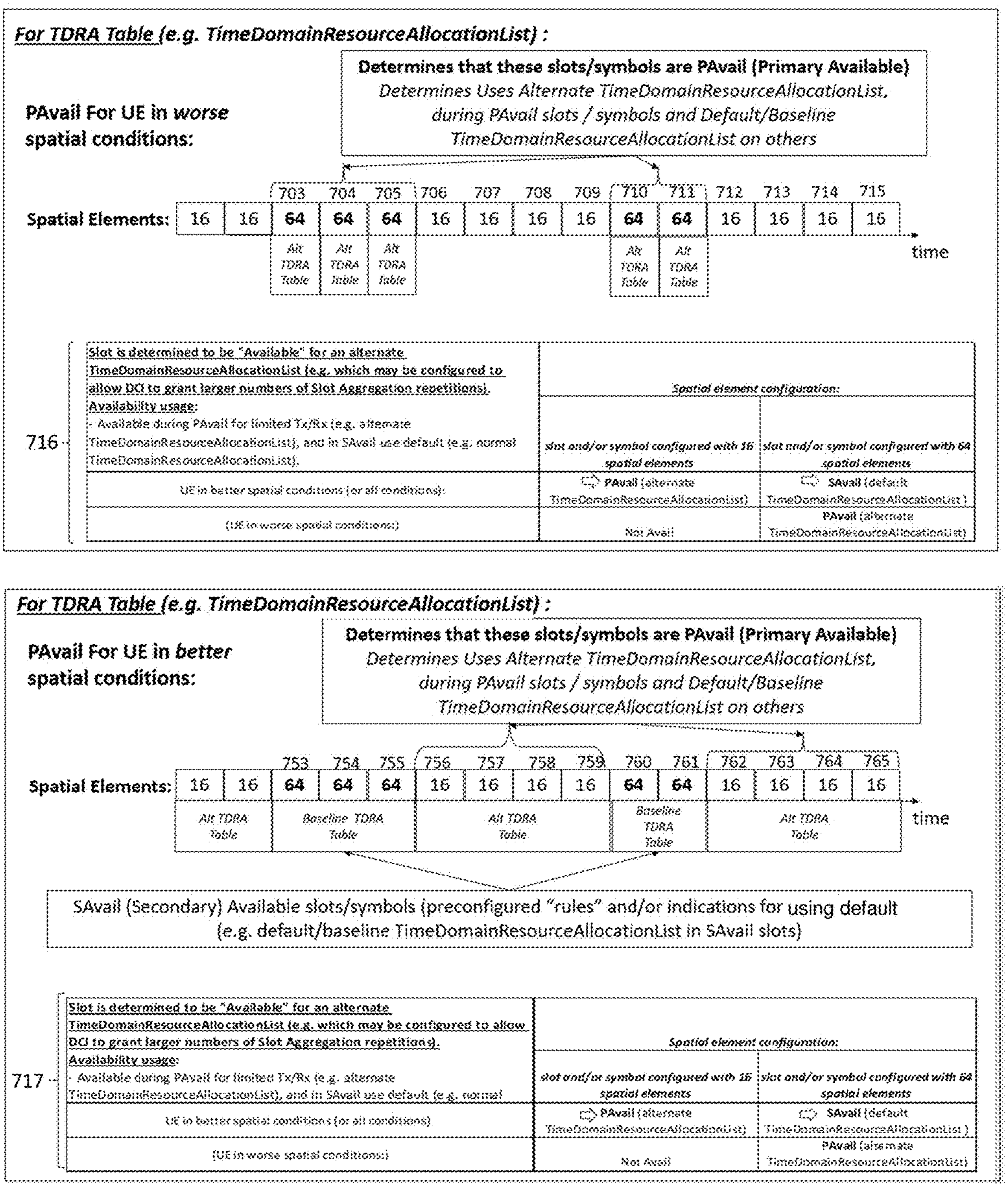
FIG. 7E depicts a TimeDomainResourceAllocationList embodiment.

FIG. 7E illustrates an example temporal view of the application of these preconfigured rules for slot or symbol availability in response to dynamic changes in spatial elements—for use of an alternate TimeDomainResourceAllocationList as labeled in each sub-figure. From the rule configuration 280 of FIG. 2E, the timeline of FIG. 3, and the rule configuration 716, when the UE 110 is in worse spatial conditions and receiving a DCI, the UE 110 or gNB 170 utilizes an alternate TimeDomainResourceAllocationList (TDRA table) for the slots or symbols 703, 704, 705, 710, and 711, each associated with 64 spatial elements, determined to be primary available, and determines to use the alternate TimeDomainResourceAllocationList (TDRA table) for slots or symbols 703, 704, 705, 710, and 711 and not for other slots or symbols including for example slots or symbols determined to be secondary available or not available.

Referring to FIG. 7E, from rule configuration 280 of FIG. 2E, the timeline of FIG. 3, and the rule configuration 717, when the UE 110 is in better spatial conditions is waiting to transmit on SR, the UE 110 or gNB 170 classifies slots or symbols 753, 754, 755, 760, and 761, each associated with 64 spatial elements, to be secondary available. Further, when the UE 110 is in better spatial conditions, the UE 110 or gNB 170 classifies slots or symbols 756, 757, 758, 759, 762, 763, 764, and 765, each associated with 16 spatial elements, to be primary available and determines to use an alternate TimeDomainResourceAllocationList for slots or symbols from 756, 757, 758, 759, 762, 763, 764, and 765 and not for other slots or symbols including for example those determined to be secondary available. Further, when the UE 110 is in better spatial conditions, the UE 110 or gNB 170 classifies slots or symbols 753, 754, 755, 760 and 761, each associated with 64 spatial elements, to be secondary available and determines to use an baseline/default TimeDomainResourceAllocationList for slots or symbols from 753, 754, 755, 760 and 761 and not for other slots or symbols including for example those determined to be primary available. The TimeDomainResourceAllocationList determines the usage of a DCI on the PDCCH, where for example the alternate TDRA table can enable performing a DCI grant corresponding to a larger number of repetitions for that slot, whereas the baseline/default TDRA table can enable performing a DCI grant corresponding to a smaller number of repetitions for that slot.

Figure 8:
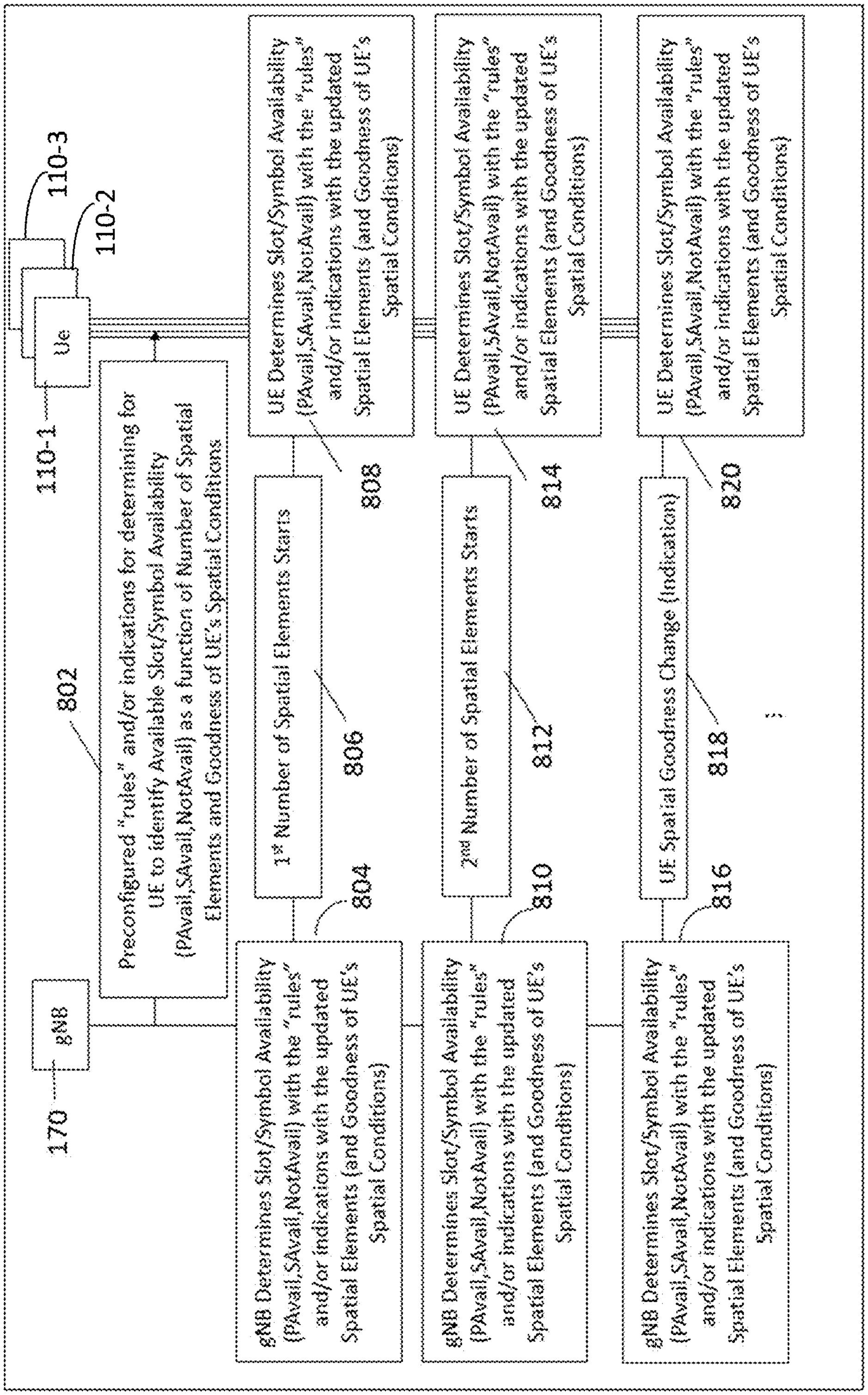
FIG. 8 shows signaling between the UE and the cell based on the examples described herein.

FIG. 8 illustrates example signaling between UE 110 and the cell hosted by gNB 170 for aspects of the examples described herein. FIG. 8 depicts gNB 170 and three UEs including UE 110-1, UE 110-2, and UE 110-3. At 802, the gNB 170 configures for a plurality of UEs (110-1, 110-2, 110-3) rules and/or indications for determining for the UEs to identify slot or symbol availability such as primary available, secondary available and not available as a function of a number of spatial elements and the goodness or quality of the UE's (110-1, 110-2, 110-3) spatial conditions. At 804, the gNB 170 determines slot or symbol availability (primary available, secondary available, not available) with the rules and/or indications with the updated spatial elements and goodness of the UE's spatial conditions. At 806, the first number of spatial elements starts advertised. At 808, the UE (110-1, 110-2, 110-3) determines slot or symbol availability (primary available, secondary available and not available) with the rules and/or indications with the updated spatial elements and goodness of the UE's spatial conditions.

At 810, the gNB 170 determines slot or symbol availability (primary available, secondary available, not available) with the rules and/or indications with the updated spatial elements and goodness of the UE's spatial conditions. At 812, the second number of spatial elements starts advertised. At 814, the UE (110-1, 110-2, 110-3) determines slot or symbol availability (primary available, secondary available and not available) with the rules and/or indications with the updated spatial elements and goodness of the UE's spatial conditions.

At 816, the gNB 170 determines slot or symbol availability (primary available, secondary available, not available) with the rules and/or indications with the updated spatial elements and goodness of the UE's spatial conditions. At 818, the spatial goodness of the UE (110-1, 110-2, 110-3) changes, with in some examples the UE (110-1, 110-2, 110-3) indicating the change to the gNB 170, or the gNB 170 indicating the change to the UE (110-1, 110-2, 110-3). At 820, the UE (110-1, 110-2, 110-3) determines slot or symbol availability (primary available, secondary available and not available) with the rules and/or indications with the updated spatial elements and goodness of the UE's spatial conditions.

Figure 9:
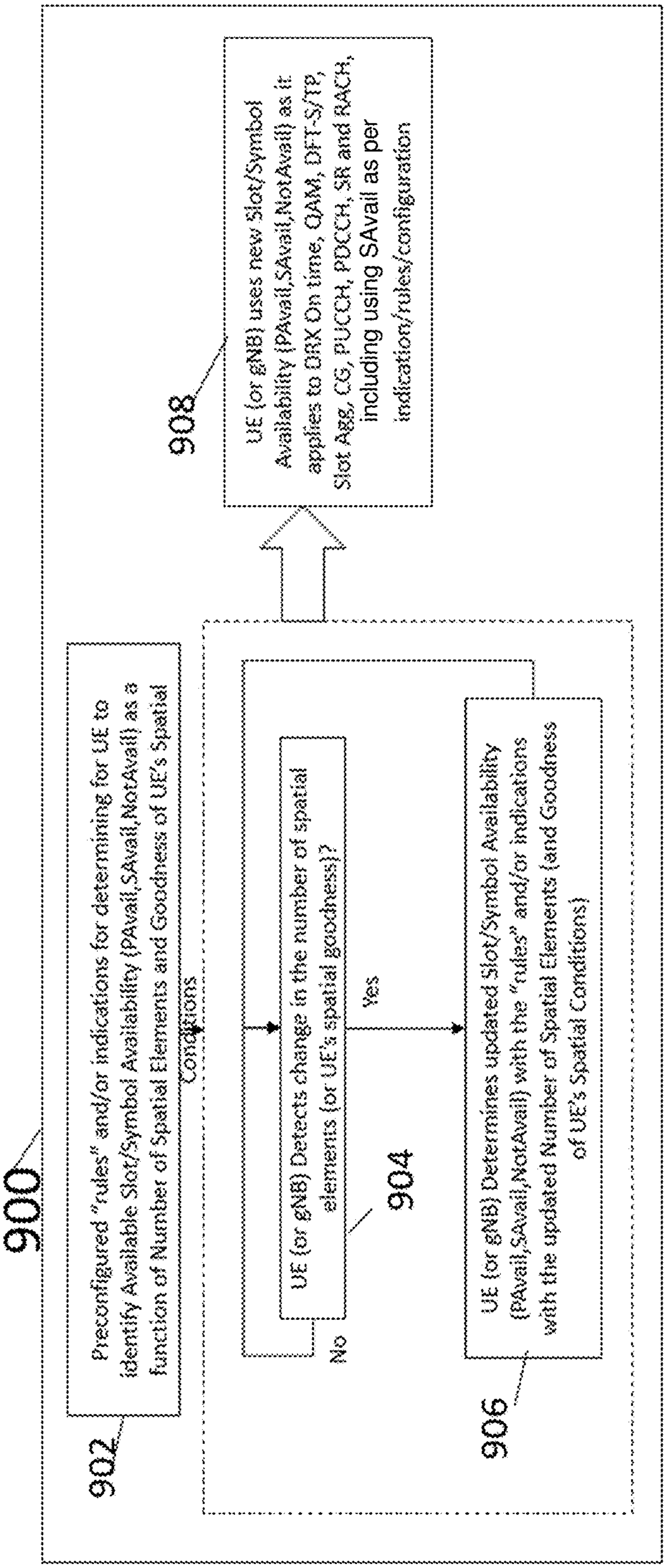
FIG. 9 is a flow diagram of a method to implement the examples described herein.

FIG. 9 is an example flow diagram of a method 900 that implements one or more of the examples described herein. At 902 (which may be performed by gNB 170 or UE 110), preconfigured rules and/or indications are set and/or transmitted for determining for the UE 110 to identify slot availability (e.g. primary available, secondary available and not available) as a function of number of spatial elements and goodness/quality of the UE's spatial conditions. At 904, the UE 110 or gNB 170 detects a change in the number of spatial elements or the UE's spatial goodness. In response to there being a change in the number of spatial elements or the UE's spatial goodness determined at 904 (e.g. "Yes") the method transitions to 906. In response to there not being a change in the number of spatial elements or the UE's spatial goodness determined at 904 (e.g. "No") the method transitions to 904 again. If there is no change in gNB spatial elements or UE spatial goodness then there is no change in the PAvail/SAvail/NotAvail classification.

At 906, the UE 110 or gNB 170 determines slot or symbol availability (e.g. primary available, secondary available and not available) with the rules and/or indications with the updated number of spatial elements or the change to the UE's spatial conditions. At 908, the UE 110 or gNB 170 uses the new slot or symbol availability (e.g. primary available, secondary available and not available) as it applies to DRX on time, QAM, DFT-S/TP, slot aggregation, CG, PDCCH Aggregation Level, PUCCH, SR, RACH and TimeDomainResourceAllocationList. From 908, the method transitions to 904, as the method 900 is iterative.

There are several advantages and technical effects of the examples described herein. The examples described herein enable the gNB 170 and UE 110 to dynamically adapt the determination of which slots are available in response to the dynamically changing spatial configuration and UE spatial goodness as needed to appropriately utilize the spatial configuration after each change in the spatial configuration while avoiding frequent signaling/overhead at the time of each change in the spatial elements. The examples described herein may be reflected in at least 3GPP release 18 TS 38.331, TS 38.214, and 38.321.

Figure 10:
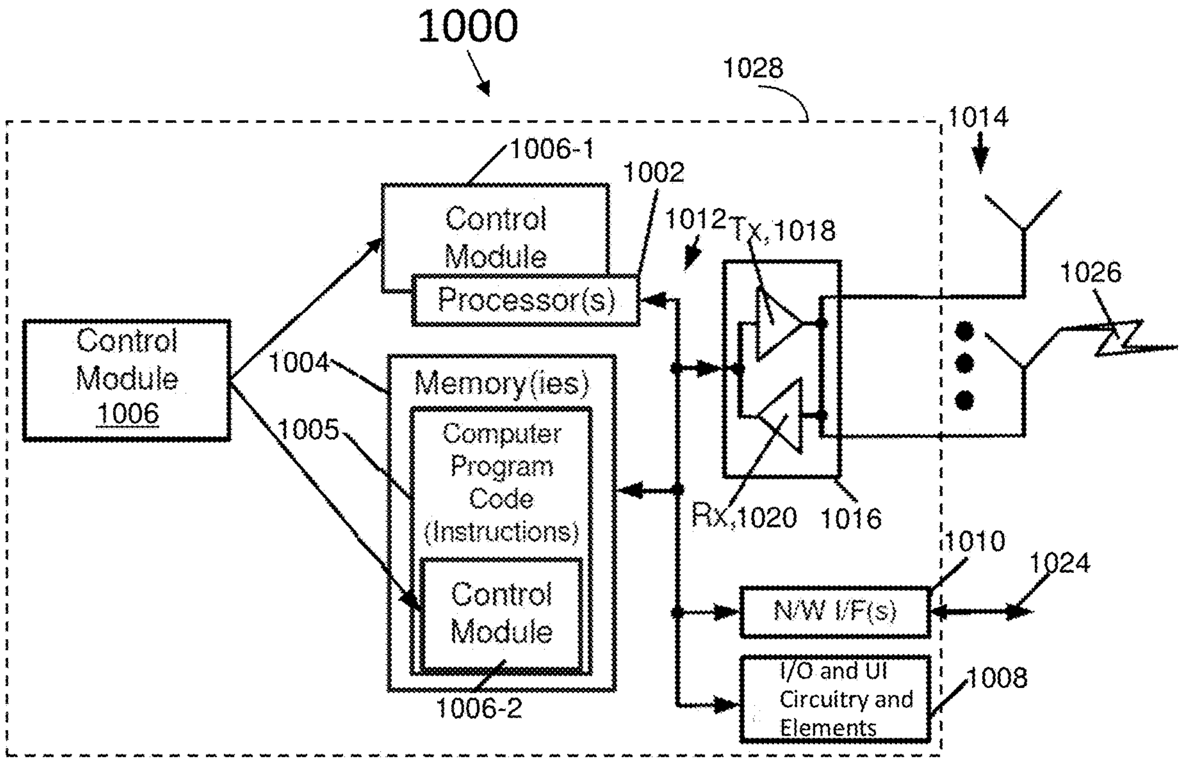
FIG. 10 is an example apparatus configured to implement the examples described herein.

FIG. 10 is an example apparatus 1000, which may be implemented in hardware, configured to implement the examples described herein. The apparatus 1000 comprises at least one processor 1002 (e.g. an FPGA and/or CPU), one or more memories 1004 including computer program code 1005, the computer program code 1005 having instructions to carry out the methods described herein, wherein the at least one memory 1004 and the computer program code 1005 are configured to, with the at least one processor 1002, cause the apparatus 1000 to implement circuitry, a process, component, module, or function (implemented with control module 1006) to implement the examples described herein, including slot or symbol reclassification for dynamically adapted spatial elements. The memory 1004 may be a non-transitory memory, a transitory memory, a volatile memory (e.g. RAM), or a non-volatile memory (e.g. ROM).

The apparatus 1000 includes a display and/or I/O interface 1008, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 1000 includes one or more communication e.g. network (N/W) interfaces (I/F(s)) 1010. The communication I/F(s) 1010 may be wired and/or wireless and communicate over the Internet/other network(s) via any communication technique including via one or more links 1024. The link(s) 1024 may be the link(s) 131 and/or 176 from FIG. 1. The link(s) 131 and/or 176 from FIG. 1 may also be implemented using transceiver(s) 1016 and corresponding wireless link(s) 1026. The communication I/F(s) 1010 may comprise one or more transmitters or one or more receivers.

The transceiver 1016 comprises one or more transmitters 1018 and one or more receivers 1020. The transceiver 1016 and/or communication I/F(s) 1010 may comprise standard well-known components such as an amplifier, filter, frequency-converter, (de)modulator, and encoder/decoder circuitries and one or more antennas, such as antennas 1014 used for communication over wireless link 1026.

The control module 1006 of the apparatus 1000 comprises one of or both parts 1006-1 and/or 1006-2, which may be implemented in a number of ways. The control module 1006 may be implemented in hardware as control module 1006-1, such as being implemented as part of the one or more processors 1002. The control module 1006-1 may be implemented also as an integrated circuit or through other hardware such as a programmable gate array. In another example, the control module 1006 may be implemented as control module 1006-2, which is implemented as computer program code (having corresponding instructions) 1005 and is executed by the one or more processors 1002. For instance, the one or more memories 1004 store instructions that, when executed by the one or more processors 1002, cause the apparatus 1000 to perform one or more of the operations as described herein. Furthermore, the one or more processors 1002, one or more memories 1004, and example algorithms (e.g., as flowcharts and/or signaling diagrams), encoded as instructions, programs, or code, are means for causing performance of the operations described herein.

The apparatus 1000 to implement the functionality of control 1006 may be UE 110, RAN node 170 (e.g. gNB), or network element(s) 190. Thus, processor 1002 may correspond to processor(s) 120, processor(s) 152 and/or processor(s) 175, memory 1004 may correspond to one or more memories 125, one or more memories 155 and/or one or more memories 171, computer program code 1005 may correspond to computer program code 123, computer program code 153, and/or computer program code 173, control module 1006 may correspond to module 140-1, module 140-2, module 150-1, and/or module 150-2, and communication I/F(s) 1010 and/or transceiver 1016 may correspond to transceiver 130, antenna(s) 128, transceiver 160, antenna(s) 158, N/W I/F(s) 161, and/or N/W I/F(s) 180. Alternatively, apparatus 1000 and its elements may not correspond to either of UE 110, RAN node 170, or network element(s) 190 and their respective elements, as apparatus 1000 may be part of a self-organizing/optimizing network (SON) node or other node, such as a node in a cloud.

The apparatus 1000 may also be distributed throughout the network (e.g. 100) including within and between apparatus 1000 and any network element (such as a network control element (NCE) 190 and/or the RAN node 170 and/or the UE 110).

Interface 1012 enables data communication and signaling between the various items of apparatus 1000, as shown in FIG. 10. For example, the interface 1012 may be one or more buses such as address, data, or control buses, and may include any interconnection mechanism, such as a series of lines on a motherboard or integrated circuit, fiber optics or other optical communication equipment, and the like. Computer program code (e.g. instructions) 1005, including control 1006 may comprise object-oriented software configured to pass data or messages between objects within computer program code 1005. The apparatus 1000 need not comprise each of the features mentioned, or may comprise other features as well. The various components of apparatus 1000 may at least partially reside in a common housing 1028, or a subset of the various components of apparatus 1000 may at least partially be located in different housings, which different housings may include housing 1028.

Figure 11:
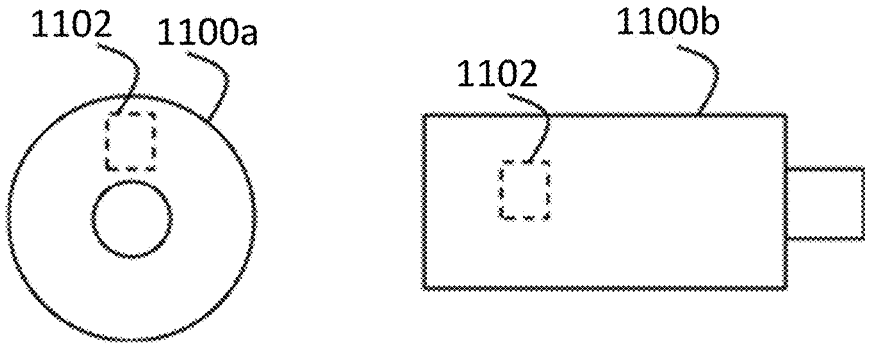
FIG. 11 shows a representation of an example of non-volatile memory media.

FIG. 11 shows a schematic representation of non-volatile memory media 1100*a* (e.g. computer/compact disc (CD) or digital versatile disc (DVD)) and 1100*b* (e.g. universal serial bus (USB) memory stick) storing instructions and/or parameters 1102 which when executed by a processor allows the processor to perform one or more of the steps of the methods described herein.

Figure 12:
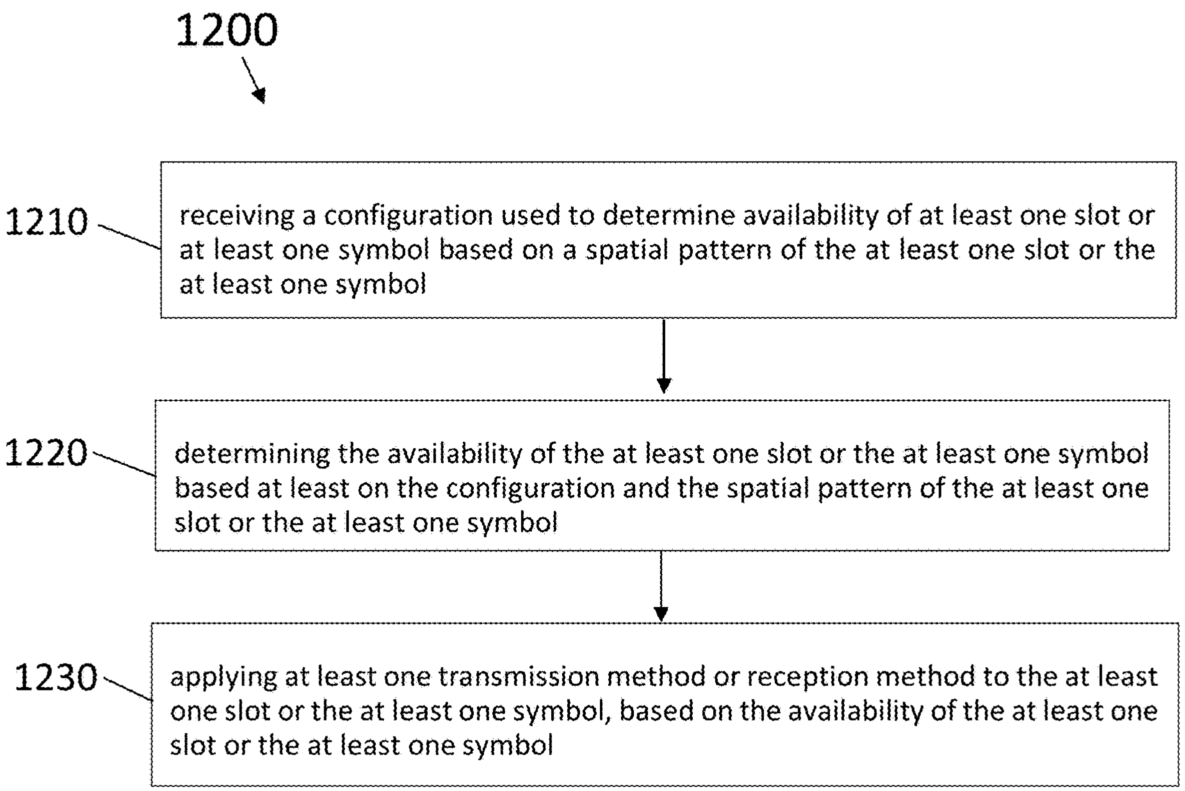
FIG. 12 is an example method implementing the examples described herein.

FIG. 12 is an example method 1200 to implement the example embodiments described herein. At 1210, the method includes receiving a configuration used to determine availability of at least one slot or at least one symbol based on a spatial pattern of the at least one slot or the at least one symbol. At 1220, the method includes determining the availability of the at least one slot or the at least one symbol based at least on the configuration and the spatial pattern of the at least one slot or the at least one symbol. At 1230, the method includes applying at least one transmission method or reception method to the at least one slot or the at least one symbol, based on the availability of the at least one slot or the at least one symbol. Method 1200 may be performed with UE 110 or apparatus 1000.

Figure 13:
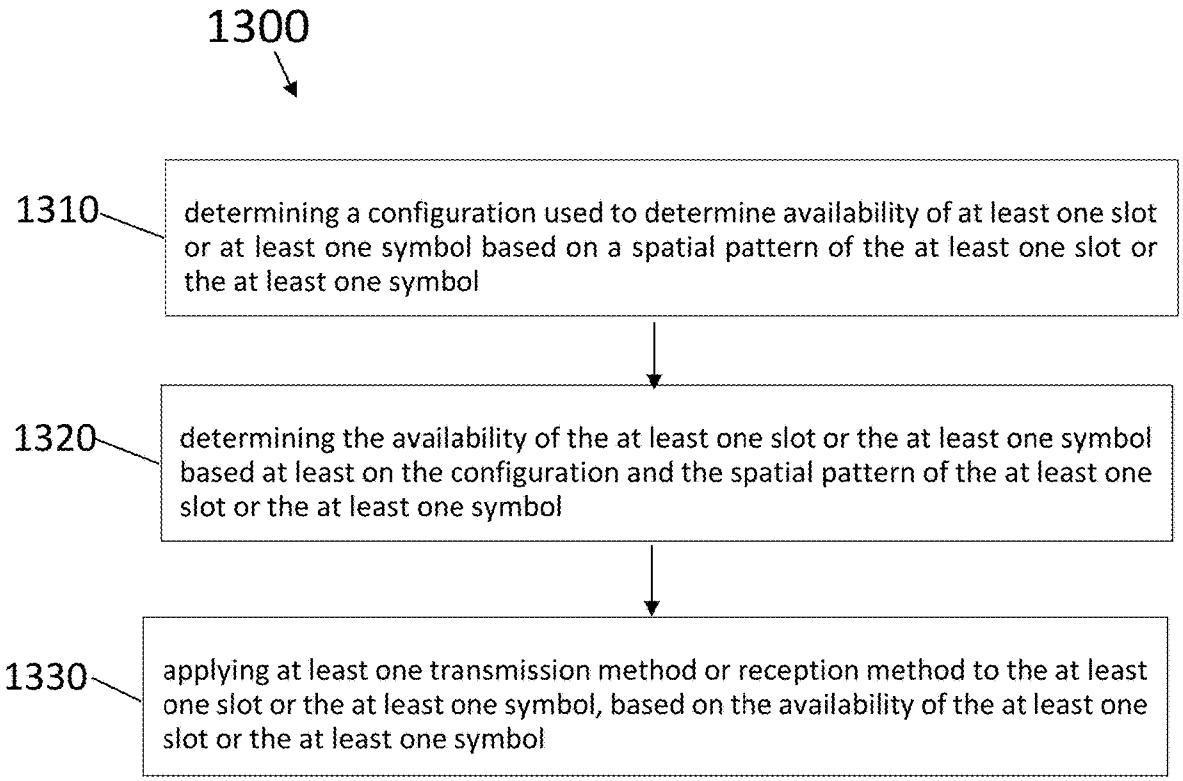
FIG. 13 is an example method implementing the examples described herein.

FIG. 13 is an example method 1300 to implement the example embodiments described herein. At 1310, the method includes determining a configuration used to determine availability of at least one slot or at least one symbol based on a spatial pattern of the at least one slot or the at least one symbol. At 1320, the method includes determining the availability of the at least one slot or the at least one symbol based at least on the configuration and the spatial pattern of the at least one slot or the at least one symbol. At 1330, the method includes applying at least one transmission method or reception method to the at least one slot or the at least one symbol, based on the availability of the at least one slot or the at least one symbol. Method 1300 may be performed with RAN node 170 or apparatus 1000.

The following examples are provided and described herein.

Example 1. An apparatus including: at least one processor; and at least one memory storing instructions that, when executed by the at least one processor, cause the apparatus at least to: receive a configuration used to determine availability of at least one slot or at least one symbol based on a spatial pattern of the at least one slot or the at least one symbol; determine the availability of the at least one slot or the at least one symbol based at least on the configuration and the spatial pattern of the at least one slot or the at least one symbol; and apply at least one transmission method or reception method to the at least one slot or the at least one symbol, based on the availability of the at least one slot or the at least one symbol.

Example 2. The apparatus of example 1, wherein the instructions, when executed by the at least one processor, cause the apparatus at least to: determine a number of at least one spatial element of the at least one slot or the at least one symbol, based on the spatial pattern; wherein the determination of the availability of the at least one slot or the at least one symbol is based at least on the number of the at least one spatial element of the at least one slot or the at least one symbol.

Example 3. The apparatus of any of examples 1 to 2, wherein the instructions, when executed by the at least one processor, cause the apparatus at least to: determine a spatial condition of a user equipment.

Example 4. The apparatus of example 3, wherein the determination of the availability of the at least one slot or the at least one symbol is based at least on the spatial condition of the user equipment.

Example 5. The apparatus of any of examples 3 to 4, wherein the configuration specifies at least one parameter to determine the availability of the at least one slot or the at least one symbol based at least on the spatial condition of the user equipment.

Example 6. The apparatus of any of examples 1 to 5, wherein the instructions, when executed by the at least one processor, cause the apparatus at least to: determine the availability of the at least one slot or the at least one symbol in response to a change of the spatial pattern of the at least one slot or the at least one symbol.

Example 7. The apparatus of example 6, wherein the spatial pattern comprises a number of at least one spatial element, and the number of the at least one spatial element is greater than zero before and after the change of the spatial pattern of the at least one slot or the at least one symbol.

Example 8. The apparatus of any of examples 6 to 7, wherein the instructions, when executed by the at least one processor, cause the apparatus at least to: receive an indication of the change of the spatial pattern of the at least one slot or the at least one symbol.

Example 9. The apparatus of example 8, wherein the indication of the change of the spatial pattern of the at least one slot or the at least one symbol is received with at least one of: radio resource control signaling; a medium access control control element; downlink control information; a dedicated group common signaling, a radio network temporary identifier, or periodic spatial partitioning.

Example 10. The apparatus of any of examples 3 to 10, wherein the instructions, when executed by the at least one processor, cause the apparatus at least to: determine the availability of the at least one slot or the at least one symbol in response to a change of the spatial condition of the user equipment.

Example 11. The apparatus of example 10, wherein the instructions, when executed by the at least one processor, cause the apparatus at least to: receive an indication of the change of the spatial condition of the user equipment.

Example 12. The apparatus of example 11, wherein the indication of the change of the spatial condition of the user equipment is received with at least one of: user equipment assistance information, channel state information, downlink control information, or a time domain resource allocation table.

Example 13. The apparatus of any of examples 1 to 12, wherein the configuration relates to multiple slots or multiple symbols, and the configuration repeats in time.

Example 14. The apparatus of any of examples 1 to 13, wherein the instructions, when executed by the at least one processor, cause the apparatus at least to: delay, based on the configuration, the application of the at least one transmission method or reception method for a number of at least one slot or a number of at least one symbol determined to be at least one of secondarily available or not available.

Example 15. The apparatus of example 14, wherein the application of the at least one transmission method or reception method is delayed up to a threshold number of the at least one slot or the at least one symbol.

Example 16. The apparatus of any of examples 14 to 15, wherein the instructions, when executed by the at least one processor, cause the apparatus at least to: apply the transmission method or reception method to a set of at least one slot or at least one symbol determined to be primarily available.

Example 17. The apparatus of example 16, wherein the set of at least one slot or at least one symbol determined to be primarily available is sequentially after the at least one slot or the at least one symbol determined to be secondarily available or not available.

Example 18. The apparatus of any of examples 16 to 17, wherein slots or symbols of the set of at least one slot or at least one symbol determined to be primarily available are contiguous.

Example 19. The apparatus of any of examples 15 to 18, wherein the instructions, when executed by the at least one processor, cause the apparatus at least to: determine a number of at least one slot or at least one symbol within a first set of at least one slot or at least one symbol determined to be secondarily available or not available greater than the threshold number; and apply the transmission method or reception method to a second set of at least one slot or at least one symbol determined to be secondarily available or not available, based on the determination of the number of the at least one slot or symbol within the first set of at least one slot or at least one symbol determined to be secondarily available or not available greater than the threshold number.

Example 20. The apparatus of example 19, wherein the second set of at least one slot or at least one symbol determined to be secondarily available or not available is sequentially after the first set of at least one slot or at least one symbol determined to be secondarily available or not available.

Example 21. The apparatus of any of examples 19 to 20, wherein slots or symbols of the first set of at least one slot or at least one symbol determined to be secondarily available or not available are contiguous.

Example 22. The apparatus of any of examples 19 to 21, wherein slots or symbols of the second set of at least one slot or at least one symbol determined to be secondarily available or not available are contiguous.

Example 23. The apparatus of any of examples 1 to 22, wherein the at least one transmission method or reception method comprises at least one of: on duration associated with discontinuous reception of a user equipment, on duration associated with discontinuous transmission of a user equipment, sleeping status of a user equipment, repetition for uplink, repetition for downlink, quadrature amplitude modulation configuration, transform precoding, a modulation and coding scheme table or configuration, a physical downlink control channel aggregation level, a configured grant, or a random access channel.

Example 24. The apparatus of any of examples 1 to 23, wherein the spatial pattern comprises at least one of: a number of at least one antenna port, a number of at least one active transceiver chain, or a channel state information reference signal resource set configuration.

Example 25. The apparatus of any of examples 3 to 24, wherein the spatial condition of the user equipment comprises at least a first condition and a second condition, the first condition being associated with a relatively better condition than the second condition, and the second condition being associated with a relatively worse condition than the first condition.

Example 26. The apparatus of any of examples 1 to 25, wherein the availability of the at least one slot or the at least one symbol comprises one of: primary available, secondary available, not available, or unavailable.

Example 27. The apparatus of any of examples 1 to 26, wherein the apparatus comprises a user equipment.

Example 28. The apparatus of any of examples 1 to 27, wherein a radio access network node or network device comprises the spatial pattern.

Example 29. The apparatus of any of examples 1 to 28, wherein a user equipment comprises the spatial pattern.

Example 30. The apparatus of any of examples 1 to 29, wherein the configuration is received from a radio access network node or network device.

Example 31. An apparatus including: at least one processor; and at least one memory storing instructions that, when executed by the at least one processor, cause the apparatus at least to: determine a configuration used to determine availability of at least one slot or at least one symbol based on a spatial pattern of the at least one slot or the at least one symbol; determine the availability of the at least one slot or the at least one symbol based at least on the configuration and the spatial pattern of the at least one slot or the at least one symbol; and apply at least one transmission method or reception method to the at least one slot or the at least one symbol, based on the availability of the at least one slot or the at least one symbol.

Example 32. The apparatus of example 31, wherein the instructions, when executed by the at least one processor, cause the apparatus at least to: determine a number of at least one spatial element of the at least one slot or the at least one symbol, based on the spatial pattern; wherein the determination of the availability of the at least one slot or the at least one symbol is based at least on the number of the at least one spatial element of the at least one slot or the at least one symbol.

Example 33. The apparatus of any of examples 31 to 32, wherein the instructions, when executed by the at least one processor, cause the apparatus at least to: determine a spatial condition of a user equipment.

Example 34. The apparatus of example 33, wherein the determination of the availability of the at least one slot or the at least one symbol is based at least on the spatial condition of the user equipment.

Example 35. The apparatus of any of examples 33 to 34, wherein the configuration specifies at least one parameter to determine the availability of the at least one slot or the at least one symbol based at least on the spatial condition of the user equipment.

Example 36. The apparatus of any of examples 31 to 35, wherein the instructions, when executed by the at least one processor, cause the apparatus at least to: determine the availability of the at least one slot or the at least one symbol in response to a change of the spatial pattern of the at least one slot or the at least one symbol.

Example 37. The apparatus of example 36, wherein the spatial pattern comprises a number of at least one spatial element, and the number of the at least one spatial element is greater than zero before and after the change of the spatial pattern of the at least one slot or the at least one symbol.

Example 38. The apparatus of any of examples 36 to 37, wherein the instructions, when executed by the at least one processor, cause the apparatus at least to: transmit or receive an indication of the change of the spatial pattern of the at least one slot or the at least one symbol.

Example 39. The apparatus of example 38, wherein the indication of the change of the spatial pattern of the at least one slot or the at least one symbol is transmitted or received with at least one of: radio resource control signaling; a medium access control control element; downlink control information; a dedicated group common signaling, a radio network temporary identifier, or periodic spatial partitioning.

Example 40. The apparatus of any of examples 33 to 39, wherein the instructions, when executed by the at least one processor, cause the apparatus at least to: determine the availability of the at least one slot or the at least one symbol in response to a change of the spatial condition of the user equipment.

Example 41. The apparatus of example 40, wherein the instructions, when executed by the at least one processor, cause the apparatus at least to: receive an indication of the change of the spatial condition of the user equipment.

Example 42. The apparatus of example 41, wherein the indication of the change of the spatial condition of the user equipment is received with at least one of: user equipment assistance information, channel state information, uplink control information, or a time domain resource allocation table.

Example 43. The apparatus of any of examples 31 to 42, wherein the configuration relates to multiple slots or multiple symbols, and the configuration repeats in time.

Example 44. The apparatus of any of examples 31 to 43, wherein the instructions, when executed by the at least one processor, cause the apparatus at least to: delay, based on the configuration, the application of the at least one transmission method or reception method for a number of at least one slot or a number of at least one symbol determined to be at least one of secondarily available or not available.

Example 45. The apparatus of example 44, wherein the application of the at least one transmission method or reception method is delayed up to a threshold number of the at least one slot or the at least one symbol.

Example 46. The apparatus of any of examples 44 to 45, wherein the instructions, when executed by the at least one processor, cause the apparatus at least to: apply the transmission method or reception method to a set of at least one slot or at least one symbol determined to be primarily available.

Example 47. The apparatus of example 46, wherein the set of at least one slot or at least one symbol determined to be primarily available is sequentially after the at least one slot or the at least one symbol determined to be secondarily available or not available.

Example 48. The apparatus of any of examples 46 to 47, wherein slots or symbols of the set of at least one slot or at least one symbol determined to be primarily available are contiguous.

Example 49. The apparatus of any of examples 45 to 48, wherein the instructions, when executed by the at least one processor, cause the apparatus at least to: determine a number of at least one slot or at least one symbol within a first set of at least one slot or at least one symbol determined to be secondarily available or not available greater than the threshold number; and apply the transmission method or reception method to a second set of at least one slot or at least one symbol determined to be secondarily available or not available, based on the determination of the number of the at least one slot or symbol within the first set of at least one slot or at least one symbol determined to be secondarily available or not available greater than the threshold number.

Example 50. The apparatus of example 49, wherein the second set of at least one slot or at least one symbol determined to be secondarily available or not available is sequentially after the first set of at least one slot or at least one symbol determined to be secondarily available or not available.

Example 51. The apparatus of any of examples 49 to 50, wherein slots or symbols of the first set of at least one slot or at least one symbol determined to be secondarily available or not available are contiguous.

Example 52. The apparatus of any of examples 49 to 51, wherein slots or symbols of the second set of at least one slot or at least one symbol determined to be secondarily available or not available are contiguous.

Example 53. The apparatus of any of examples 31 to 52, wherein the at least one transmission method or reception method comprises at least one of: on duration associated with discontinuous reception of a user equipment, on duration associated with discontinuous transmission of a user equipment, sleeping status of a user equipment, repetition for uplink, repetition for downlink, quadrature amplitude modulation configuration, transform precoding, a modulation and coding scheme table or configuration, a physical downlink control channel aggregation level, a configured grant, or a random access channel.

Example 54. The apparatus of any of examples 31 to 53, wherein the spatial pattern comprises at least one of: a number of at least one antenna port, a number of at least one active transceiver chain, or a channel state information reference signal resource set configuration.

Example 55. The apparatus of any of examples 33 to 54, wherein the spatial condition of the user equipment comprises at least a first condition and a second condition, the first condition being associated with a relatively better condition than the second condition, and the second condition being associated with a relatively worse condition than the first condition.

Example 56. The apparatus of any of examples 31 to 55, wherein the availability of the at least one slot or the at least one symbol comprises one of: primary available, secondary available, not available, or unavailable.

Example 57. The apparatus of any of examples 31 to 56, wherein the apparatus comprises a radio access network node or network device.

Example 58. The apparatus of any of examples 31 to 57, wherein a radio access network node or network device comprises the spatial pattern.

Example 59. The apparatus of any of examples 31 to 58, wherein a user equipment comprises the spatial pattern.

Example 60. The apparatus of any of examples 31 to 59, wherein the configuration is received from a user equipment, a radio access network node, or a network device.

Example 61. A method including: receiving a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

Example 62. A method including: determining a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

Example 63. An apparatus including: means for receiving a configuration used to determine availability of at least one slot or at least one symbol based on a spatial pattern of the at least one slot or the at least one symbol; means for determining the availability of the at least one slot or the at least one symbol based at least on the configuration and the spatial pattern of the at least one slot or the at least one symbol; and means for applying at least one transmission method or reception method to the at least one slot or the at least one symbol, based on the availability of the at least one slot or the at least one symbol.

Example 64. An apparatus including: means for determining a configuration used to determine availability of at least one slot or at least one symbol based on a spatial pattern of the at least one slot or the at least one symbol; means for determining the availability of the at least one slot or the at least one symbol based at least on the configuration and the spatial pattern of the at least one slot or the at least one symbol; and means for applying at least one transmission method or reception method to the at least one slot or the at least one symbol, based on the availability of the at least one slot or the at least one symbol.

Example 65. A non-transitory program storage device readable by a machine, tangibly embodying a program of instructions executable by the machine for performing operations, the operations including: receiving a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

Example 66. A non-transitory program storage device readable by a machine, tangibly embodying a program of instructions executable by the machine for performing operations, the operations including: determining a configuration used to determine availability of at least one slot or at least one symbol based on a spatial pattern of the at least one slot or the at least one symbol; determining the availability of the at least one slot or the at least one symbol based at least on the configuration and the spatial pattern of the at least one slot or the at least one symbol; and applying at least one transmission method or reception method to the at least one slot or the at least one symbol, based on the availability of the at least one slot or the at least one symbol.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In the figures, lines and arrows between individual blocks represent operational couplings there-between, and arrows represent the direction of data flows on those couplings.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash, hyphen, slash, or number):

3GPP third generation partnership project
4G fourth generation
5G fifth generation
5GC 5G core network
AAU active antenna unit
Agg aggregation
AL aggregation level
AMF access and mobility management function
ASIC application-specific integrated circuit
BTS base transceiver station
BWP bandwidth part
CCE channel control element
CD compact/computer disc
CE control element
CG configured grant
Config-Id configuration identifier
CORESET control resource set
CP cyclic prefix
CPU central processing unit
CSI channel state information
CU central unit or centralized unit
DCI downlink control information
DFT discrete Fourier transform
DFT-S discrete Fourier transform spread
DFT-S-OFDM discrete Fourier transform spread orthogonal frequency division multiplexing
DL downlink
DRX discontinuous reception
DSP digital signal processor
DTX discontinuous transmission
DU distributed unit
DVD digital versatile disc
eNB evolved Node B (e.g., an LTE base station)
EN-DC E-UTRAN new radio—dual connectivity
en-gNB node providing NR user plane and control plane protocol terminations towards the UE, and acting as a secondary node in EN-DC
E-UTRA evolved universal terrestrial radio access, i.e., the LTE radio access technology
E-UTRAN E-UTRA network
F1 interface between the CU and the DU
FPGA field-programmable gate array
GC group common
gNB base station for 5G/NR, i.e., a node providing NR user plane and control plane protocol terminations towards the UE, and connected via the NG interface to the 5GC
GSMA Global System for Mobile Communications Association
IAB integrated access and backhaul
I/F interface
IM interference measurement
I/O input/output
LMF location management function
LTE long term evolution (4G)
MAC medium access control
MCS modulation and coding scheme
MME mobility management entity
MRO mobility robustness optimization
NCE network control element
ng or NG new generation
ng-eNB new generation eNB
NG-RAN new generation radio access network
NotAvail not available slot or symbol
NR new radio
N/W network
NW network
NZP non-zero power
OFDM orthogonal frequency division multiplexing
OPEX operating expenses
PAvail primary available slot or symbol
PDA personal digital assistant
PDCCH physical downlink control channel
PDCP packet data convergence protocol
PDSCH physical downlink shared channel
PHY physical layer
PUCCH physical uplink control channel
PUSCH physical uplink shared channel
QAM quadrature amplitude modulation
QoS quality of service
RACH random access channel
RAM random access memory
RAN radio access network
RAN1 radio layer 1
RAN2 radio layer 2
RAN3 UTRAN/E-UTRAN/NG-RAN architecture and related network interfaces
RE resource element
Rel release
Rep repetition
RF radio frequency
RLC radio link control
ROM read-only memory
RNTI radio network temporary identifier
RP RAN meeting
RRC radio resource control
RS reference signal
RU radio unit
Rx or RX receiver or reception
SAg slot aggregation
SAvail secondary available slot or symbol
SGW serving gateway
SSS search space set
SIB system information block
SMF session management function
SON self-organizing/optimizing network
SR scheduling request
TCI transmission configuration indicator
TDRA time domain resource allocation (or TimeDomainResourceAllocationList)
TP transform precoding
TR technical report
TRP transmission reception point
TS technical specification
Tx or TX transmitter or transmission
UAV unmanned aerial vehicle
UE user equipment (e.g., a wireless, typically mobile device)
UI user interface
UL uplink
UMTS universal mobile telecommunications system
UPF user plane function
USB universal serial bus
UTRAN UMTS terrestrial radio access network WID work item description
X2 network interface between RAN nodes and between RAN and the core network
Xn network interface between NG-RAN nodes
XR extended reality
ZP zero power

What is claimed is:

1. An apparatus comprising:
at least one processor; and
at least one memory storing instructions that, when executed by the at least one processor, cause the apparatus at least to:
receive a configuration used to determine availability of at least one slot or at least one symbol for discontinuous reception on-duration of the apparatus based on both:
(i) a spatial pattern of the at least one slot or the at least one symbol indicating whether respective slots or symbols are configured with sixteen active spatial elements or sixty-four active spatial elements, and
(ii) whether the apparatus is in a better spatial condition or a worse spatial condition; receive an indication of a change in the spatial pattern for one or more upcoming slots or symbols;
determine, in response to the indication of the change in the spatial pattern, the availability of the at least one slot or the at least one symbol based at least on the configuration and the spatial pattern of the at least one slot or the at least one symbol, wherein, when the apparatus is in the better spatial condition, a slot or symbol configured with sixteen active spatial elements is determined to be primary available for the discontinuous reception on-duration and a slot or symbol configured with sixty-four active spatial elements is determined to be secondary available for the discontinuous reception on-duration, and wherein, when the apparatus is in the worse spatial condition, a slot or symbol configured with sixty-four active spatial elements is determined to be primary available for the discontinuous reception on-duration and a slot or symbol configured with sixteen active spatial elements is determined to be not available for the discontinuous reception on-duration; and
apply at least one transmission method or reception method to the at least one slot or the at least one symbol, based on the availability of the at least one slot or the at least one symbol, wherein the at least one reception method comprises applying the discontinuous reception on-duration by:
delaying a start of the discontinuous reception on-duration across one or more slots or symbols determined to be secondary available or not available so that the discontinuous reception on-duration overlaps one or more slots or symbols determined to be primary available, and
based on a number of slots or symbols across which the start of the discontinuous reception on-duration would be delayed exceeds a threshold number, applying the discontinuous reception on-duration to at least one slot or symbol determined to be secondary available.

2. The apparatus of claim 1, wherein the instructions, when executed by the at least one processor, cause the apparatus at least to:
determine a spatial condition of a user equipment.

3. The apparatus of claim 2, wherein the configuration specifies at least one parameter to determine the availability of the at least one slot or the at least one symbol based at least on the spatial condition of the user equipment.

4. The apparatus of claim 2, wherein the instructions, when executed by the at least one processor, cause the apparatus at least to:
determine the availability of the at least one slot or the at least one symbol in response to a change of the spatial condition of the user equipment.

5. The apparatus of claim 4, wherein the instructions, when executed by the at least one processor, cause the apparatus at least to:
receive an indication of the change of the spatial condition of the user equipment.

6. A method performed by a user equipment, the method comprising:
receive a configuration used to determine availability of at least one slot or at least one symbol for discontinuous reception on-duration of the user equipment based on both:
(i) a spatial pattern of the at least one slot or the at least one symbol indicating whether respective slots or symbols are configured with sixteen active spatial elements or sixty-four active spatial elements, and
(ii) whether the user equipment is in a better spatial condition or a worse spatial condition;
receive an indication of a change in the spatial pattern for one or more upcoming slots or symbols;
determine, in response to the indication of the change in the spatial pattern, the availability of the at least one slot or the at least one symbol based at least on the configuration and the spatial pattern of the at least one slot or the at least one symbol, wherein, when the user equipment is in the better spatial condition, a slot or symbol configured with sixteen active spatial elements is determined to be primary available for the discontinuous reception on-duration and a slot or symbol configured with sixty-four active spatial elements is determined to be secondary available for the discontinuous reception on-duration, and wherein, when the user equipment is in the worse spatial condition, a slot or symbol configured with sixty-four active spatial elements is determined to be primary available for the discontinuous reception on-duration and a slot or symbol configured with sixteen active spatial elements is determined to be not available for the discontinuous reception on-duration; and
apply at least one transmission method or reception method to the at least one slot or the at least one symbol, based on the availability of the at least one slot or the at least one symbol, wherein the at least one reception method comprises applying the discontinuous reception on-duration by:
delaying a start of the discontinuous reception on-duration across one or more slots or symbols determined to be secondary available or not available so that the discontinuous reception on-duration overlaps one or more slots or symbols determined to be primary available, and
based on a number of slots or symbols across which the start of the discontinuous reception on-duration would be delayed exceeds a threshold number, applying the discontinuous reception on-duration to at least one slot or symbol determined to be secondary available.

7. The method of claim 6, wherein receiving the indication of the change in the spatial pattern comprises receiving the indication using at least one of radio resource control signaling, a medium access control control element, downlink control information, group-common signaling, a radio network temporary identifier, or periodic spatial partitioning.

8. The method of claim 7, wherein the configuration applies to a plurality of slots or a plurality of symbols and repeats in time.

9. The method of claim 8, further comprising determining whether the user equipment is in the better spatial condition or the worse spatial condition based on channel state information measured by the user equipment.

10. The method of claim 9, further comprising redetermining the availability of the at least one slot or the at least one symbol in response to a change of the user equipment from the better spatial condition to the worse spatial condition or from the worse spatial condition to the better spatial condition.

11. The method of claim 10, further comprising transmitting, to a radio access network node, an indication of the change of the user equipment from the better spatial condition to the worse spatial condition or from the worse spatial condition to the better spatial condition using at least one of user equipment assistance information or channel state information.

12. The method of claim 11, wherein the threshold number is configured by a radio access network node as a maximum number of slots or symbols across which the start of the discontinuous reception on-duration is permitted to be delayed before the discontinuous reception on-duration is applied to the at least one slot or symbol determined to be secondary available.

13. The method of claim 12, wherein delaying the start of the discontinuous reception on-duration comprises skipping one or more slots or symbols determined to be secondary available or not available until identifying one or more contiguous slots or symbols determined to be primary available.

14. The method of claim 13, wherein applying the discontinuous reception on-duration to the at least one slot or symbol determined to be secondary available comprises applying the discontinuous reception on-duration to a slot or symbol configured with sixty-four active spatial elements while the user equipment is in the better spatial condition.

15. The method of claim 14, wherein the sixteen active spatial elements and the sixty-four active spatial elements comprise at least one of active antenna ports, active transceiver chains, antenna elements, or channel state information reference signal resources.

* * * * *